(12) United States Patent
Johnson et al.

(10) Patent No.: US 6,525,772 B2
(45) Date of Patent: *Feb. 25, 2003

(54) METHOD AND APPARATUS FOR CALIBRATING A TILED DISPLAY

(75) Inventors: Michael J. Johnson, Phoenix, AZ (US); Chung-Jen Chen, Phoenix, AZ (US); Rajesh Chandrasekhar, Phoenix, AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/877,603

(22) Filed: Jun. 8, 2001

(65) Prior Publication Data

US 2002/0027608 A1 Mar. 7, 2002

Related U.S. Application Data

(63) Continuation of application No. 09/158,995, filed on Sep. 23, 1998, now Pat. No. 6,310,650.

(51) Int. Cl.⁷ ................................................. H04N 5/66
(52) U.S. Cl. ...................................... 348/383; 348/189
(58) Field of Search ........................ 348/383, 744–747, 348/189, 190, 181, 36; 345/1.3, 20

(56) References Cited

U.S. PATENT DOCUMENTS

| 3,833,764 A | 9/1974 | Taylor ..................... 178/7.5 D |
| 4,103,435 A | 8/1978 | Herndon .................... 35/12 N |
| 4,974,073 A | 11/1990 | Inova ........................... 358/87 |
| 5,136,390 A | 8/1992 | Inova et al. ................. 358/231 |
| 5,216,504 A | 6/1993 | Webb et al. ................. 358/139 |
| 5,231,481 A | 7/1993 | Eouzan et al. ................ 358/60 |
| 5,396,257 A * | 3/1995 | Someya et al. ................ 345/1 |
| 5,475,447 A | 12/1995 | Funado |
| 5,543,870 A | 8/1996 | Blanchard .................... 353/74 |
| 5,555,035 A | 9/1996 | Mead et al. ................. 348/757 |
| 5,626,410 A | 5/1997 | Chambers et al. ............ 353/94 |
| 5,657,073 A | 8/1997 | Henley ........................ 348/38 |
| 5,661,531 A | 8/1997 | Greene et al. ................ 349/73 |
| 5,668,569 A | 9/1997 | Greene et al. ............. 345/103 |
| 5,737,038 A | 4/1998 | Gale et al. ................... 348/759 |
| 5,793,441 A | 8/1998 | Hagerman |
| 5,796,425 A | 8/1998 | Minami et al. ............. 348/181 |
| 5,838,396 A | 11/1998 | Shiota et al. ................ 348/745 |
| 6,018,361 A | 1/2000 | Fujii et al. ................... 348/180 |
| 6,219,011 B1 * | 4/2001 | Aloni et al. ..................... 345/1 |
| 6,259,429 B1 * | 7/2001 | Gwynn ........................ 345/150 |
| 6,288,756 B1 * | 9/2001 | Shiota et al. ................ 348/712 |

FOREIGN PATENT DOCUMENTS

| EP | 0 739 131 A | 10/1996 |
| EP | 0 739 133 A | 10/1996 |
| EP | 0 786 687 A | 7/1997 |
| FR | 2 660 090 A | 9/1991 |
| WO | WO 99/29116 | 6/1999 |
| WO | WO 99/31877 | 6/1999 |

OTHER PUBLICATIONS

Bergstedt, Robert et al., "Microlaser–based Displays," *SPIE*, vol. 3057, (1997) pp. 362–367.

(List continued on next page.)

*Primary Examiner*—Victor R. Kostak

(57) ABSTRACT

A display system that can be calibrated and re-calibrated with a minimal amount of manual intervention. To accomplish this, one or more cameras are provided to capture an image of the display screen. The resulting captured image is processed to identify any non-desirable characteristics, including visible artifacts such as seams, bands, rings, etc. Once the non-desirable characteristics are identified, an appropriate transformation function is determined. The transformation function is used to pre-warp the input video signal that is provided to the display such that the non-desirable characteristics are reduced or eliminated from the display. The transformation function preferably compensates for spatial non-uniformity, color non-uniformity, luminance non-uniformity, and other visible artifacts.

17 Claims, 18 Drawing Sheets

OTHER PUBLICATIONS

Collins, Robert, T. et al., "Matching Perspective Views of Coplanar Structures using Projective Unwarping and Similarity Matching," IEEE Conference on Computer Vision and Pattern Recognition, Jun. 1993, 10 pages.

Cruz–Neira, Carolina et al., "Surround–Screen Projection–Based Virtual Reality: The Design and Implementation of the CAVE," *SIGGRAPH 93*, Computer Graphics Proceedings, Annual Conference Series, (1993) pp. 135–142.

Czernuszenko, Marek et al., "The ImmersaDesk and Infinity Wall Projection–Based Virtual Reality Displays," *Computer Graphics*, May 1997, pp. 46–49.

Freeman, K.G., "A Multi–Standard High–Definition Television Projector," *The Journal of the Institution of Electronic and Radio Engineers*, vol. 55, No. 2, Feb. 1985, pp. 47–53.

Fuchs, Henry et al., "Virtual Space Teleconferencing using a Sea of Cameras," 7 pages.

Gonzales, Rafael C. et al., *Digital Imaging Processing*, 2nd Edition, pp. 246–251.

Holmes, Richard E., "Videorama™—A New Concept in Juxtaposed Large Screen Displays," *SPIE*, vol. 1081, (1989) pp. 15–20.

Ishii, Hiroshi et al., "Iterative Design of Seamless Collaboration Media," *Communications of the ACM*, vol. 37, No. 8, Aug. 1994, 16 pages.

Iwata et al., "A Seamless Multiscreen Display," *Mitsubishi Denki Giho*, vol. 71, No. 2 (1997), pp. 80–83 (with English translation attached).

Lin, Chun–Chuan et al., "Performance Measurement of Projection Display," *SPIE*, vol. 2892, (1996) pp. 148–153.

Mayer, Theo., "Design Considerations and Applications for Innovative Display Options Using Projector Arrays," *SPIE*, vol. 2650, (1996) pp. 131–139.

Raskar, Ramesh et al., "Efficient Image Generation for Multiprojector and Multisurface Displays," Department of Computer Science, University of North Carolina, (1998) 12 pages.

Raskar, Ramesh et al., "The Office of the Future: A Unified Approach to Image–Based Modeling and Spatially Immersive Displays," *SIGGRAPH 98*, Computer Graphics Proceedings, Annual Conference Series, (1998) pp. 1–10.

Tsai, Roger Y., "An Efficient and Accurate Camera Calibration Technique for 3D Machine Vision," *Proceedings CVPR '86*, IEEE Computer Society, (1986) pp. 364–374.

Wang, K.C. et al., "Assessment of Metal Halide Lamp for the Illumination of LCD–Based Projection Display," *SPIE*, vol. 2407, (1995) pp. 36–46.

Wolberg, George, *Digital Image Warping*, IEEE Computer Society Press Monograph, pp. 50–51.

Pamphlet, *MIMiCAM™ Automated Monitor Alignment & Inspection System*, Display Laboratories, Inc., (1994) 6 pages.

Patent Abstracts of Japan, vol. 1996, No. 09, Sep. 30, 1996 and JP 08 126018A (Hitachi Ltd.) May 17, 1996 abstract.

Patent Abstracts of Japan, vol. 1995, No. 06, Jul. 31, 1995 and JP 07 064522 A (Hitachi Ltd.) Mar. 10, 1995 abstract.

Patent Abstracts of Japan, vol. 015, No. 037 (P–1159) Jan. 29, 1991 and JP 02 273 790 A (Nippon Telegr & Teleph Corp), Nov. 8, 1990 abstract: figures 1–6.

Patent Abstracts of Japan, vol. 012, No. 049 (E–582), Feb. 13, 1988 & JP 62 195984 A (Sony Corp), Aug. 29, 1987 abstract.

Patent Abstracts of Japan, vol. 016, NO. 352 (E–1241), Jul. 29, 1992 & JP 04 108279 A (Matsushita Electric Ind. Co. Ltd.), Apr. 9, 1992 abstract.

Patent Abstracts of Japan, vol. 007, No. 236 (E–205), Oct. 20, 1983 & JP 58 125986 A (Mitsubishi Denki KK), Jul. 27, 1983 abstract.

Patent Abstracts of Japan, vol. 1996, No. 1, Jan. 31, 1996 and JP 07 239504 A (Mitsubishi) Sep. 12, 1995.

Patent Abstracts of Japan, vol. 1996, No. 6, Jun. 28, 1996 and JP 08 050469 A (Hitachi Denshi Ltd) Feb. 20, 1996.

Patent Abstracts of Japan, vol. 1996, No. 4, Apr. 20, 1996 and JP 07 333760 A (Hitachi) Dec. 22, 1995.

Patent Abstracts of Japan, JP 57–111187 (NEC Home Electronics, Ltd.) Dec. 27, 1980.

* cited by examiner

METHOD AND APPARATUS FOR CALIBRATING A TILED DISPLAY

CROSS REFERENCE TO APPLICATIONS

The present application is a continuation of U.S. patent application Ser. No. 09/158,995, filed Sep. 23, 1998, entitled "METHOD AND APPARATUS FOR CALIBRATING A TILED DISPLAY", now U.S. Pat. No. 6,310,650, which is related to U.S. patent application Ser. No. 09/159,340, filed Sep. 23, 1998, entitled "METHOD AND APPARATUS FOR PROVIDING A SEAMLESS TILED DISPLAY", now U.S. Pat. No. 6,377,306, and U.S. patent application Ser. No. 09/159,024, filed Sep. 23, 1998, entitled "METHOD AND APPARATUS FOR CALIBRATING A DISPLAY USING AN ARRAY OF CAMERAS", now U.S. Pat. No. 6,219,099, all of which are assigned to the assignee of the present invention and incorporated herein by reference.

BACKGROUND OF THE INVENTION

This invention relates to calibrating displays, and more particularly, to calibrating tiled projection displays that use multiple projectors to produce larger and/or higher resolution images.

Multiple projector systems have been proposed and used for many years. In the 1950s, the "CINERAMA" system was developed for the film industry. The CINERAMA system projected three films using three separate projectors, which were combined to form a single panoramic image. Disneyland continues to use a similar multiple projector system. At Disneyland, a circle of projectors shines onto a screen that circles the wall of a round room.

In the video field, multiple projector systems have been proposed and used for a number of specialty applications. For example, U.S. Pat. No. 4,103,435 to Herndon and U.S. Pat. No. 3,833,764 to Taylor suggest using multiple projector systems for flight simulators. In many of these systems, multiple video screens are placed next to each other to form a large image display for multiple projectors. A difficulty with many of the video based multiple projector display systems is making the multiple images appear as one single continuous image on the display screen.

When two images are projected side-by-side on a single screen, there is normally a seam between the images. The final display image will either appear as two images placed side-by-side with a gap in between or, if the images are made to overlap on a single screen, there will be a bright line where the two images overlap. Because of the inconsistencies in conventional cameras, video processing, delivery channels, displays and, specifically, projectors, it is exceedingly difficult to perfectly match the resultant video images so that no tiling artifacts appear among the images. If the images are brought very close together on the same screen, there is typically both gaps and overlaps at each seam.

The article entitled *Design Considerations and Applications for Innovative Display Options Using Projector Arrays*, by Theo Mayer, SPIE Vol. 2650 (1996), pp. 131–139, discloses projecting a number of discrete images in an overlapping relation and ramping the brightness of the discrete images in the overlapping regions of each image. Mayer discloses using a blending function to fade down each overlapping edge of the discrete images in such a way so as to compensate for the gamma (video signal reduction vs. light output curve) of a phosphor, light valve or LCD projector, with the goal of producing a uniform brightness across the display.

U.S. Pat. No. 5,136,390 to Inova et al. recognizes that the blending function typically cannot be a simple even ramping function. A typical video projector produces an image that becomes darker toward the edges of the image as a natural function of the lens system used, and has a number of bright and dark portions caused by normal irregularities in the signal, intermediate signal processor, projector, screen, etc. These inconsistencies typically vary from one video component to another, and even among different components with similar construction. Also, different types of projectors often respond differently to the same amount of brightness modification. Thus, a simple ramp of the brightness in the over-lapping regions can produced light and dark bands and/or spots in the resulting image.

To overcome these limitations, Inova et al. suggest applying a simple even blending function to the overlapping regions of the image, as suggested by Mayer, but then manually tuning the simple even blending function at specific locations to remove the visible artifacts from the display. The location of each artifact is identified by manually moving a cursor over each location that is identified as having an artifact. Once the cursor is in place, the system tunes the corresponding location of the blending function so that the corresponding artifacts are removed.

Since each artifact must be manually identified by a user, the process of calibrating an entire display can be time consuming and tedious. This is particularly true since many displays require periodic re-calibration because the performance of their projectors and/or other hardware elements tend to change over time. In view of the foregoing, it would be desirable to have a display that can be calibrated and re-calibrated with less manual intervention than is required by Inova et al. and others.

SUMMARY OF THE INVENTION

The present invention overcomes many of the disadvantages of the prior art by providing a display that can be calibrated and re-calibrated with little or no manual intervention. To accomplish this, the present invention provides one or more cameras to capture an image on the display screen. The resulting captured image is processed to identify any non-desirable characteristics including visible artifacts such as seams, bands, rings, etc. Once the non-desirable characteristics are identified, an appropriate transformation function is determined. The transformation function is used to pre-warp the input video signal such that the non-desirable characteristics are reduced or eliminated from the display. The transformation function preferably compensates for spatial non-uniformity, color non-uniformity, luminance non-uniformity, and/or other visible artifacts.

In one illustrative embodiment, a tiled projection display is provided that has two or more projectors arranged in an array configuration. The projectors may be direct write (e.g. CRT, LCD, DMD, CMOS-LCD) or any other type of projector. In a tiled type display, each of the projectors preferably projects a discrete image separately onto a screen, wherein the discrete images collectively form a composite image. The discrete images may or may not overlap one another. A camera is then directed at the screen to capture a capture image of at least a portion of the composite image. The capture image may encompass less than one tile, about one tile, the entire composite image, or any other portion of the composite image that is deemed desirable.

A determining block then determines if the capture image has one or more non-desirable characteristics. The non-desirable characteristics may be determined by comparing the capture image, or a portion thereof, with a predetermined data set as more fully described below. The determining block is preferably provided in a processor or the like. In one illustrative embodiment, the processor resides in one location and services all projectors. In another illustrative embodiment, the processor function is physically distributed among the projectors.

Once the non-desirable characteristics are determined, an identifying block identifies a transformation function that can be used to process the input video signal and provide processed input video signals to selected projectors to reduce the non-desirable characteristics in the composite image. The non-desirable characteristics may include spatial non-uniformity, color non-uniformity, and/or luminance non-uniformity, but may also include other known image artifacts or irregularities.

To determine the spatial distortion of the projection display, an input signal may be provided to selected projectors to project a number of discrete images, each exhibiting a predetermined pattern. The camera device can then be used to capture a capture image of at least a portion of the screen. Using the capture image, the distortion of the projection display can be determined by, for example, comparing the capture image with a predetermined expected image. Alternatively, or in addition to, the distortion can be determined by comparing the location of selected features of the predetermined pattern in adjacent discrete images, and more preferably, in selected overlapping regions between images. By using an affine, perspective, bilinear, polynomial, piece-wise polynomial, global spline, or similar technique, a transformation function can be determined and applied to the input video signal to compensate for the spatial distortion of each projector.

To determine the color and luminance distortion of the projection system, a number of input signals of varying intensity may be sequentially input to the projection display, wherein each input signal corresponds to a flat field image of a selected color. For example, a first input signal may correspond to a red flat field image having an LCD intensity of "255". The next input signal may also correspond to a red flat field image, but may have a LCD intensity of "220". Input signals having progressively lower intensity may be provided until the input signal has a LCD intensity of "0". This process may be repeated for both blue and green flat field images. The camera device preferably captures each of the flat field images, either as a single image if the field-of-view of the camera device corresponds to the entire display, or as multiple images if the camera device has a smaller field-of-view. The resulting images are preferably stored as an array of capture images. Once collected, the non-desirable characteristics of each capture image can be determined including the luminance domes for each projector. Thereafter, a transformation function may be determined for reducing the luminance domes across selected tiles, and matching the brightness and color of each tile with adjacent tiles.

It is contemplated that the camera device may be periodically activated to capture a new capture image. The determining block may then determine if the newly captured image has one or more non-desirable characteristics, as described above, and the identifying block may identify a new transformation function that can be used to process the input video signal and provide processed input video signals to selected projectors to reduce the identified non-desirable characteristics. Thus, it is contemplated that the present invention may also be used to periodically re-calibrate the display with little or no manual intervention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention provides a tiled display that can be calibrated and recalibrated with a minimal amount of manual intervention. To accomplish this, the present invention provides one or more cameras to capture an image of the display screen. The resulting captured image is processed to identify any non-desirable characteristics including visible artifacts such as seams, bands, rings, etc. Once the non-desirable characteristics are identified, an appropriate transformation function is determined. The transformation function is used to pre-warp the input video signal such that the non-desirable characteristics are reduced or eliminated from the display. The transformation function preferably compensates for spatial non-uniformity, color non-uniformity, luminance non-uniformity, and other visible artifacts.

Figure 1:
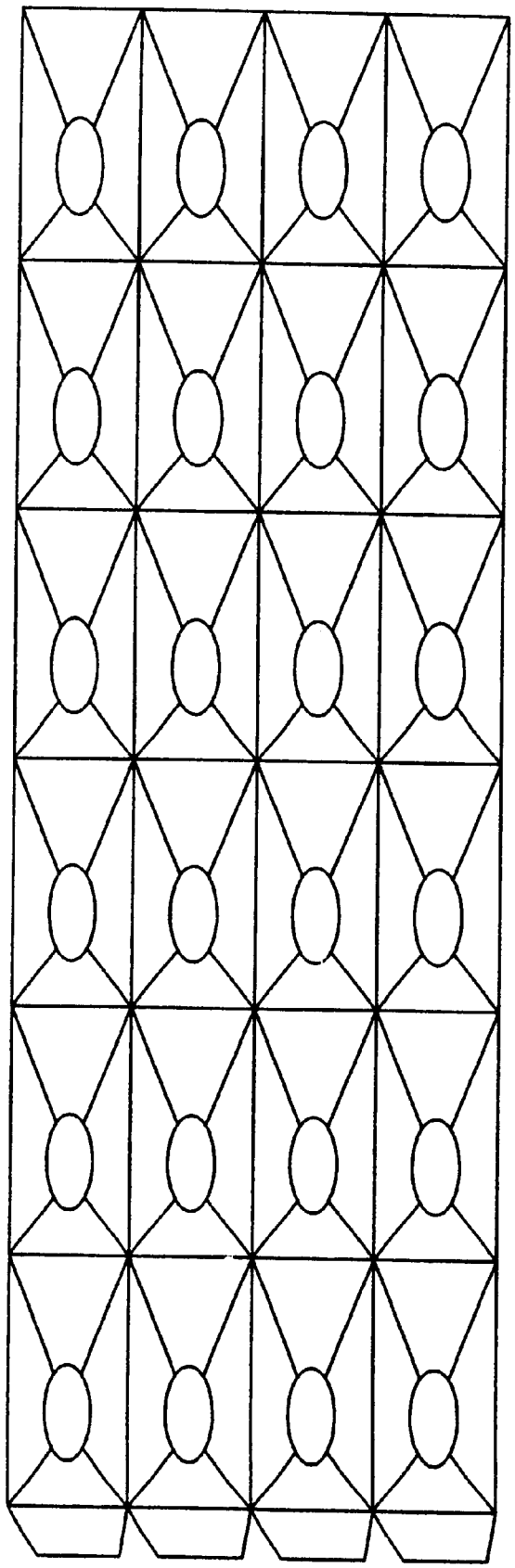
FIG. 1 is a perspective view of a four-by-six array of projectors.

In one illustrative embodiment, a tiled display is provided that has two or more projectors arranged in an array configuration. The displays may be projection displays which use CRT, LCD, DMD, CMOS-LCD or any other type of imaging device, and may be front or rear projection types. In a tiled type display, each of the projectors preferably images or projects a discrete image separately onto a surface or screen, wherein the discrete images collectively form a composite image. The discrete images may or may not overlap one another. Such a configuration is shown in FIG. 1.

Figure 2:
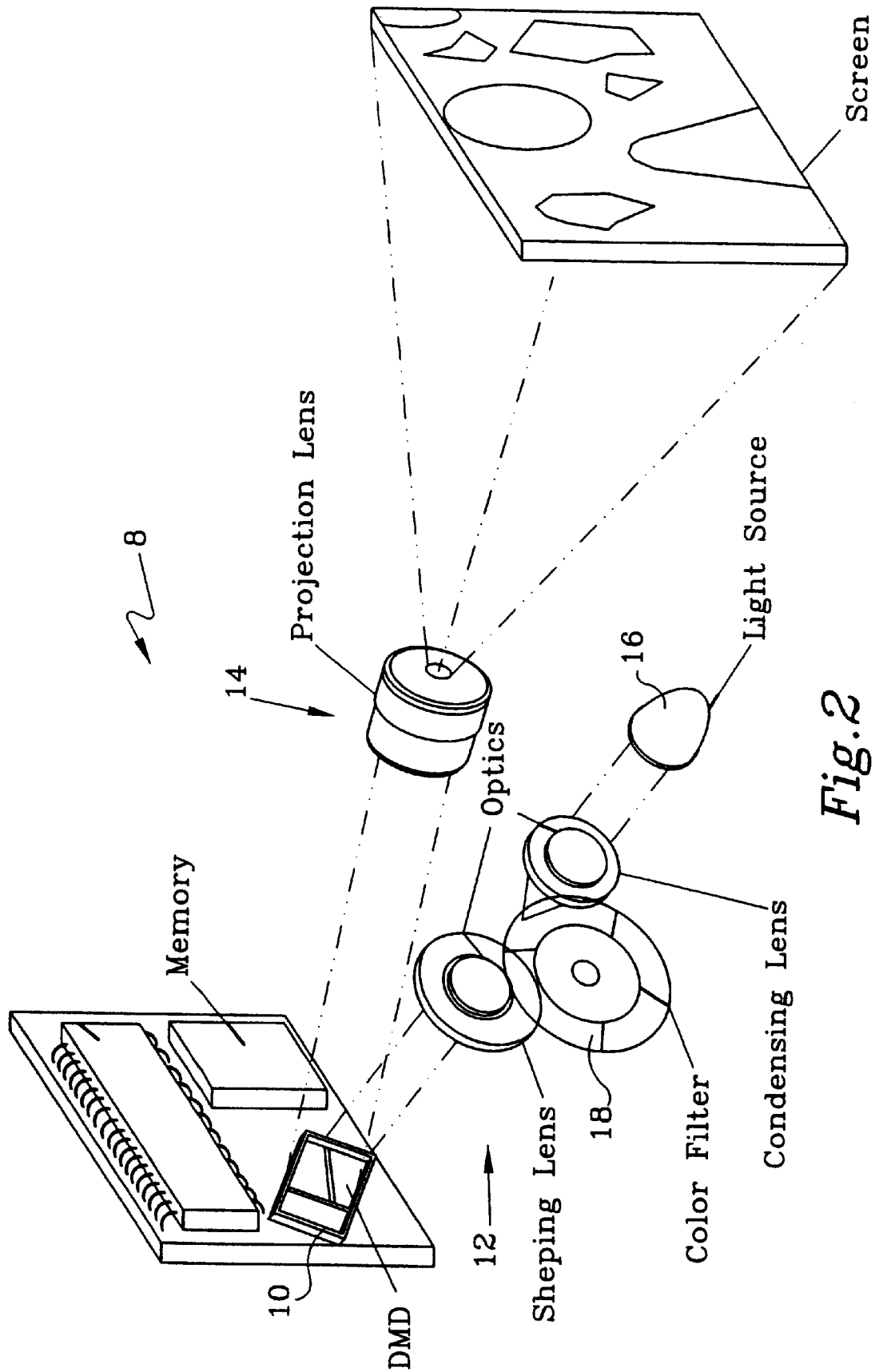
FIG. 2 is a perspective view of one illustrative projector of FIG. 1.

An illustrative projector 8 is shown in FIG. 2, and preferably uses one Digital Micromirror Device (DMD) 10. DMD devices typically include an array of electronically addressable, movable square mirrors that can be electrostatically deflected to reflect light. The use of a DMD device can provide a lightweight, reliable, digital display with a wide viewing angle and good picture clarity. Further, some DMD devices meet various MIL-STD-810 environmental and stress requirements, and can display color graphic, text and video data at various frame rates.

The projector 8 also preferably includes various optical elements to properly prepare the incoming illuminations, illuminate the DMD 10, and project the outgoing image. As shown in FIG. 2, the optical path may include two segments: the illumination path 12 and the projection path 14. The optical path may start with a high-reliability, metal halide, short-arc lamp 16 that illuminates the DMD 10. The light from the arc lamp 16 passes through a rotating RGB color filter wheel 18. An illumination relay lens magnifies the beam to illuminate the DMD 10 and form a telecentric image at the DMD 10. A Total Internal Reflection (TIR) prism 20 enables the incoming light from the lamp to pass onto the DMD 10, and back into the projection optics. Depending on the rotational state (e.g. ±10 degrees for on/off) of each mirror on the DMD, the light from the DMD 10 is directed into the pupil of the projection lens (on) or away from the pupil of the projection lens (off). A multiple-element projection cell magnifies the image coming off the DMD 10, at the desired MTF, lateral color, and distortion.

Each projector 8 may also include an electronics module (not explicitly shown). The electronics module may take the incoming data signals, convert the temporal signals into spatial representations on the DMD 10, and control the filter 18 that provides the sequential color for the display. As described below, the electronics may be modular, allowing an arbitrary number of projectors to be tiled together. Further, tiling algorithms may be incorporated into the electronics, as appropriate, to enable "smart" projectors. This may allow the electronics of each projector to automatically or manually adapt to an arbitrary configuration of projectors, with little or no manual intervention by the user.

Figure 3:
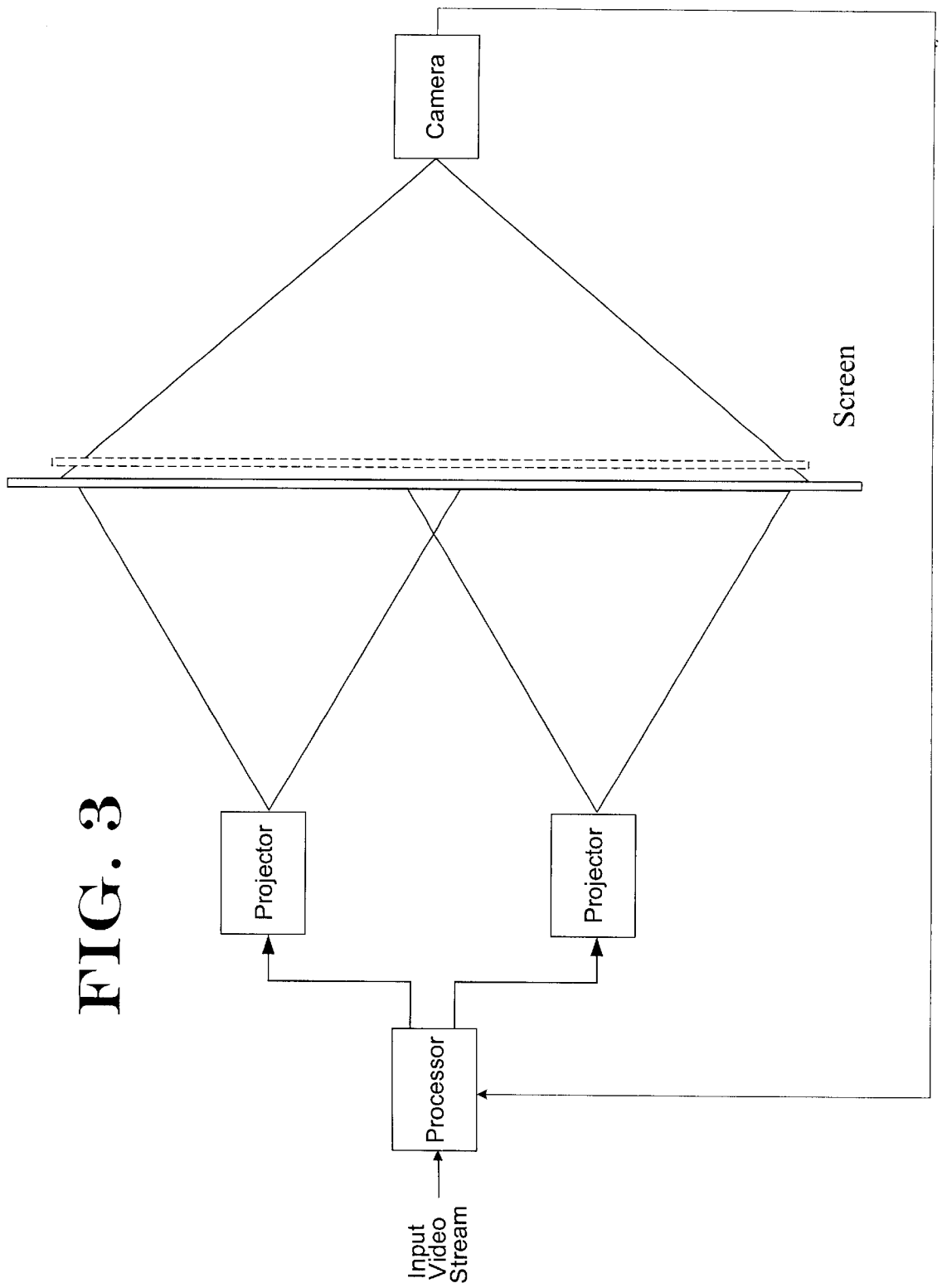
FIG. 3 is a schematic diagram of an illustrative embodiment of the present invention with the field-of-view of the camera encompassing two or more tiles.

FIG. 3 is a schematic diagram of an illustrative embodiment of the present invention with the field-of-view of the camera encompassing two or more tiles. The system is generally shown at 50, and includes a processor 52, a first display which may be a projector 54, a second display which may be a projector 56, a viewing surface or a screen 58 and a camera 62. For the purpose of illustration the display will be discussed as a projector. The first and second projectors each project a discrete image onto the screen 58, as shown. The discrete images may be overlapping or non-overlapping, and may form a composite image on the screen 58.

The processor 52 receives an input video stream 66. Because each of the projectors 54 and 56 project a portion of the desired composite image, the processor 52 preferably segments the input video stream 66 into a first input video signal 72 and a second input video signal 74. In the illustrative embodiment, the processor 52 segments the input video stream so that any overlaps between adjacent discrete images, for example overlap 60, are taken into account as is known in the art.

The input video stream 66 may be provided from any number of sources, and may be a NTSC, PAL, HDTV, workstation or PC video signal. These signal types are compatible with the RS-170 or RS-343 guidelines and specifications, for example, or more recently the VESA video signal standards and guidelines. The signals may include horizontal and vertical sync, and blanking information in addition to the active video signal used to build the output image. The sync signals may be used by the processor 52 to derive a system and/or video-sampling clock, especially in the case of an analog input signal that needs to be digitized.

Camera 62 is directed at the screen 58 as shown, and provides a camera output signal to the processor 52 via interface 64. The camera 62 may have a field-of-view that is sufficient to capture a capture image of at least a portion of the composite image. It is contemplated that the field-of-view may encompass only 1% of the composite image, 50% of the composite image, the entire composite image, or any other portion of the composite image that is deemed desirable. In a tiled display, this may correspond to only a portion of one tile, more than one tile, or all of the tiles. When the field-of-view of the camera does not encompass the entire display, it may be necessary to capture a capture image of each section of the display separately, and then assemble the results in a background or real-time mode to achieve a calibrated display over all the tiles.

In the embodiment shown, the camera 62 has a field-of-view that is sufficient to encompass the discrete images provided by the first projector 54 and the second projector 56. The capture image is provided to the processor 52 as a feedback image via interface 64. A determining block, provided in processor 52, may determine if the capture image has one or more non-desirable characteristics. Preferably, the non-desirable characteristics are determined by comparing the capture image, or a portion thereof, with a predetermined data and information set as more fully described below.

Once the non-desirable characteristics are determined, an identifying block, preferably within the processor 52, identifies a transformation function that can be used to process the input video stream 66 and provide processed input video signals to projectors 54 and 56 which reduce the non-desirable characteristics in the composite image. The non-desirable characteristics may include spatial non-uniformity, color non-uniformity, and/or luminance non-uniformity, but may also include other known image artifacts or irregularities.

It is contemplated that the projection display may be a front or rear projection display, and the camera 62 may be positioned in front of and/or behind the screen. In a second illustrative embodiment, the tiled projection display is a rear projection display having an array of tiled LCD type projectors, with each projector projecting a discrete image onto the back side of a transmissive screen 58. The transmissive screen 58 is viewed from the font side, and the camera 62 is used to capture a capture image of at least a portion of the screen 58 from the front side.

It is contemplated that the camera 62 may be a still or video electronic camera, or have an equivalent combination of components that capture the scene in a multi-point manner and deliver an electronic representation of the image to the Processor 52. In the preferred embodiment, the camera 62 is a CCD or CMOS camera, either color (e.g. multi-point calorimeter) or monochrome. The camera 62 preferably includes a photopic filter to enable the camera 62 to measure the output image in a manner that is consistent with the human visual system. Thus, noise and errors in luminance and chromaticity are measured in a way that is similar to how the eye detects such anomalies. The image may be a snapshot taken over a brief moment (e.g. less than 60 milliseconds), or over a longer exposure time (e.g. on the order of one second).

In a preferred embodiment, the camera 62 may be a conventional camera device, such as a video miniature camera that produces an analog output. The analog output is digitized and captured by a frame grabber or the like located in the processor 52. Once digitized the capture image can be stored and processed using digital processing techniques. To determine if the capture image has any non-desirable characteristics, the capture image may be compared to a predetermined data or information set. First, however, the distortion introduced by the camera 62 and associated processing hardware may be determined and removed.

To isolate the camera distortion, it is contemplated that a physical template 68 may be provided in front of the screen 58, as shown. The physical template 68 preferably includes a predetermined pattern thereon, such as an array of dots. With the physical template 68 in place, the camera 62 may capture a capture image of at least a portion of the physical template 68 including a portion of the predetermined pattern. By comparing the capture image with a predetermined expected image, and in particular, comparing the location of the dots of the predetermined pattern in the capture image to the expected locations of each of the dots, the distortion of the camera and associated hardware can be determined. Using the deviation from the expected locations, a transformation function can be determined and applied to the input video stream 66 to compensate for the camera distortion.

After the camera distortion is determined, the physical template 68 may be removed, and the distortion of the display itself can be determined. The display may have a number of types of distortion including spatial distortion, color distortion, luminance distortion, etc. To determine the spatial distortion of the projection display, for example, an input signal may be provided to selected projectors 54 and 56 to project a number of discrete images, each exhibiting a predetermined or known pattern. The camera 62 can then be used to capture a capture image of at least a portion of the screen 58. Using the capture image, the distortion of the projection display can be determined by, for example, comparing the capture image with a predetermined and/or expected image. Alternatively, or in addition to, the distortion can be determined by comparing the location of selected features of the predetermined pattern in adjacent discrete images, and more preferably, in selected overlapping regions 60 between images. By using an affine, perspective, bilinear, polynomial, piecewise polynomial, global spline or similar technique, a transformation function can be determined and applied to the input video stream 66 to compensate for the spatial distortion of the projectors 54 and 56. Preferably, the distortion introduced by the camera 62 is removed from the capture image, as described above, before the distortion of the projection system is determined.

To determine the color and luminance distortion of the projection system, a number of input signals of varying intensity may be sequentially input to the projection display, wherein each input signal corresponds to a flat field image of a selected color. For example, a first input signal may correspond to a red flat field image having an LCD input intensity of "255" or the brightest input value. The next input signal may also correspond to a red flat field image, but may have a dimmer LCD input intensity of "220". Input signals having progressively lower intensity may be provided until the input signal has a LCD input intensity of "0" or black, the dimmest input value. These inputs may be expressed as bright to dark equivalents especially if the input is an analog voltage instead of a digitally measured value. This process may be repeated for both blue and green flat field images. The camera 62 preferably captures each of the flat field images, either as a single image snapshot taken periodically when the field-of-view of the camera 62 corresponds to the entire display, or as multiple images if the camera device has a smaller field-of-view. The resulting images are preferably stored as an array of capture images or compressed versions thereof in a memory within processor block 52. Once collected, the non-desirable characteristics of each capture image can be determined including the color corresponding and input intensity variant luminance domes of each projector 54 and 56.

Once the luminance domes are identified, a ceiling and floor may be determined for both color and intensity, across the entire display. For example, one projector may be brighter than another even though all are driven at a maximum intensity (e.g. LCD "255"), and the brightness provided by each projector may decrease near the edges of the image. Accordingly, a ceiling may be selected to match the dimmest super-positon result of all the tiles when all projectors are operated at maximum intensity. Likewise, a floor may be selected to match the brightest superposition result when all projectors are operated at minimum intensity (LCD "0").

Thereafter, a transformation function may be determined for reducing the luminance domes across selected tiles, and for matching the brightness and color of each tile with adjacent tiles. For example, the transformation function may be represented by a color look up table of captured or compressed color domes, a nearest neighbor detection and identification function and an interpolation function among the nearest neighbors to determine the input level needed at the display to output the desired linear output level.

In one embodiment, the transformation function makes the luminance variation across the entire display less than about two percent, which is less than one just-noticeable-difference (JND) according to Weber's Law. To help achieve this level of luminance uniformity, the transformation function is preferably a function of the X and Y location on the display, and for some image source technologies such as polysilicon LCDs, the LCD input intensity value. Preferably, the variations across the display are held to be less than one JND in accordance with the contrast modulation sensitivity curve of human vision. This curve allows more or less variation as a function of spatial frequency.

Figure 13:
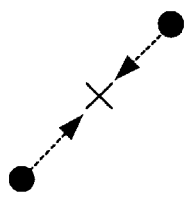
FIG. 13 is a diagram showing the operation of an illustrative transformation function that can be used to reduce the spatial distortion in a display by moving selected features toward a corrective location.
Figure 14:
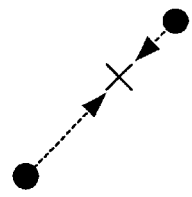
FIG. 14 is a diagram showing the operation of an illustrative transformation function that may be used to reduce the spatial distortion in a display by moving selected features toward a corrective location by a distance that is related to a relative method, a weighted average for example, modified by composite image or global constraints.

When the display has overlapping tiles, it is contemplated that the distortion of the system may be directly determined from patterns projected on the display. For a tiled display having overlapping discrete images, a first feature may be identified in a selected overlapping region, wherein the first feature is projected by a first projector. Then, a second feature may be identified in the same selected overlapping region, wherein the second feature is projected by a second projector, and wherein the second feature corresponding to the first feature. The spatial relationship between the first and second features may then be determined, and a first transformation function for the first projector can be identified therefrom. Likewise, a second transformation function for the second projector can be identified. A further discussion of this can be found below with reference to FIGS. 12–14.

Finally, it is contemplated that the camera 62 may be periodically activated to capture a new capture image. The determining block in processor 52 may determine if the newly captured image has one or more non-desirable characteristics, and the identifying block of the processor 52 may identify a new transformation function that can be used to process the input video stream 66 and provide processed input video signals to projectors 54 and 56 to reduce the identified non-desirable characteristics. Thus, it is contemplated that the present invention may be used to periodically re-calibrate the display with little or no manual intervention. The period of re-calibration may be increased or decreased as required by the operational environment. For example, it may be done at a 60 Hz rate to negate effects in a high vibration environment. In a benign environment, such as may happen in a home, the period may be reduced to 0.001 Hz or less.

It is also contemplated that processor 52 may include built-in-test logic. The built-in-self test logic may periodically detect if any portion of the display has failed, and if so, correcting for the failure by appropriately re-calibrating the display system. This is particularly useful when the discrete images overlap one another by about 50 percent or more. The 50% value, as an example, demarcates a packing arrangement which is fully redundant, leading to significant fail-operational system attributes. Fail operational means that a component can fail but the system continues to be fully operational. With a 50% overlap, if one projector fails, at least one more is ready to fill in the void resulting in significant gains in system reliability.

To save memory costs, the transformation functions, and the extracted features, information and data sets as described herein, are preferably represented and stored as a number of reduced information sets such as affine transformation or forward differencing coefficients or compression coefficients like those recommended in JPEG or MPEG specifications. Interpolation or the like can then be used to reconstruct the appropriate correction factors for any location among the selected points (see FIG. 11 below).

Figure 4:
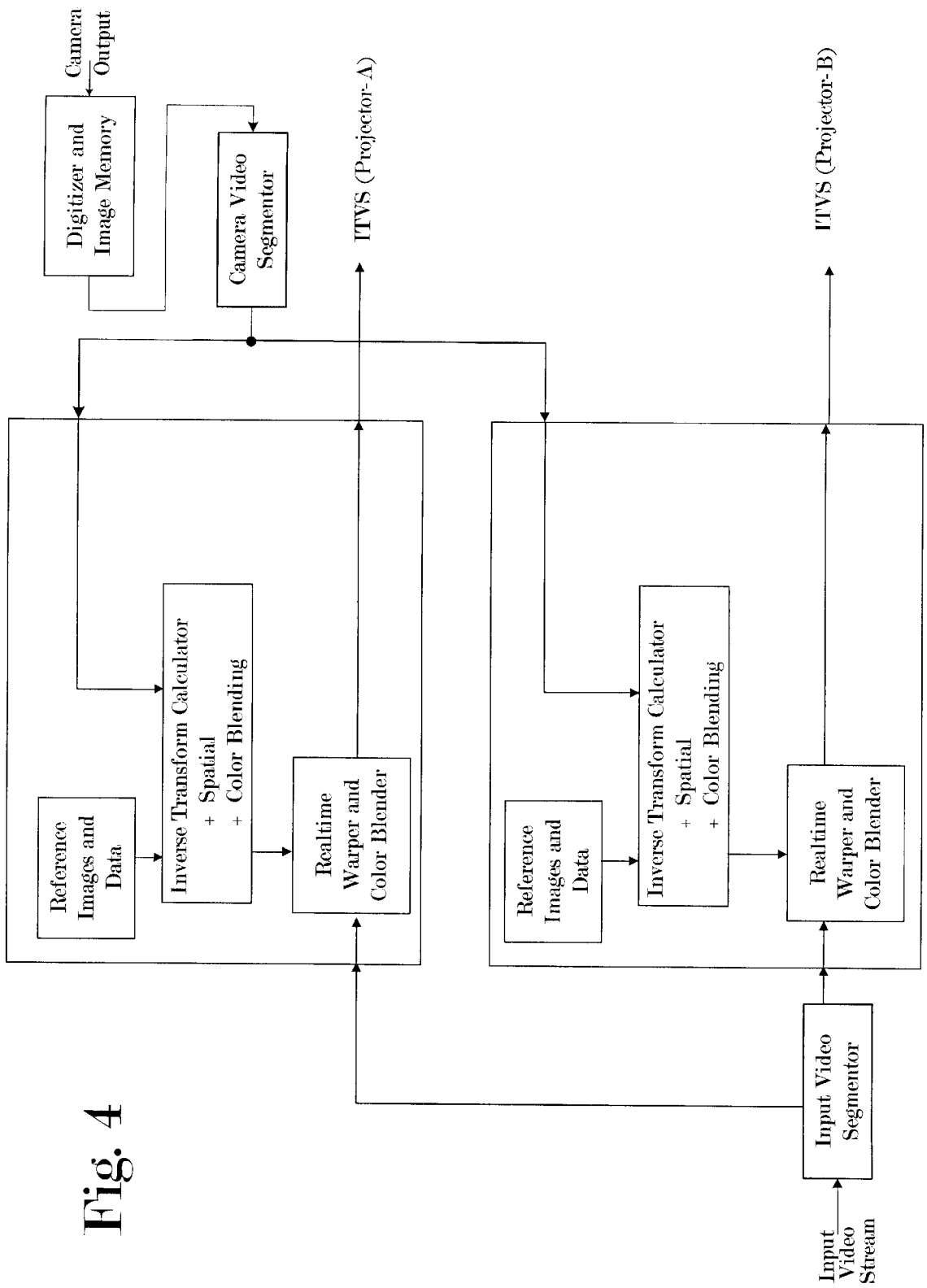
FIG. 4 is a block diagram showing an illustrative implementation for the processor block of FIG. 3.

FIG. 4 is a block diagram showing an illustrative implementation for the processor block 52 of FIG. 3. In the illustrative embodiment, the processor block 52 includes a first sub-processing block 80 for servicing the first projector 54, and a second sub-processing block 82 for servicing the second projector 56. An input video segmentor block 84 segments the input video stream 66, and provides an appropriate segmented input video signal to the first sub-processing block 80 and the second sub-processing block 82.

A Digitizer and Image Memory Block 86 receives the analog video signal 64 from the camera 62 and converts it into digital form, typically an 8 bit value for red, an 8 bit value for green and another for blue. The output of the camera 62 can be a monochrome signal or color signal. If the output of the camera 62 is monochrome, the test images of separate red, green and blue values may be shown by the projector from time to time and captured separately or in combination by the camera in combination with the Digitizer and Image Memory Block 86. The digitization function need not reside within the physical bounds of the processor. Rather, it may be a part of the camera itself. The same is true of the Image Memory. Further, these 88, 64 and 86, preferably implemented in the apparatus of a CMOS camera, may be embedded in the hardware of the sub-processor block, 80. Further, these may all be embedded in a CMOS-LCD imaging device to achieve the highest level of integration.

Because the camera 62 captures an image that corresponds to both projectors 54 and 56 (see FIG. 3), a camera segmentor block 88 may be provided to segment the capture image and provides the appropriate portions thereof to the first and second sub-processing blocks 80 and 82.

The first sub-processing block 80 preferably has access to the captured and ideal images of the first projector 54 and the neighboring projectors, including the second projector 56. The capture image, or at least the appropriate portion thereof, is analyzed by the first sub-processing block 80. For spatial compensation, a number of features may be extracted from the image which may include seeking, detecting identifying, and extracting anchor points in the image. The anchor points may be, for example, features in a predetermined pattern (e.g. an array of dots) or may be deduced from the standard input video by deriving which features in the input image which are stochastically separable and uniquely identifiable. For color compensation, the projector(s) under test may project a series of images onto the screen ranging in intensity from LCD "0" to LCD "255", for red, green and blue separately. The camera 62 may capture a color or monochrome image of each of the images on the screen. These capture images are preferably stored as an array in the Reference Images and Data block 90, which is implemented using storage media. Further, the red, green and blue compensation information may be obtained at initial setup and adjusted for example by scaling in real-time or periodically. This means the input video may be used to alter known detailed compensation data, thereby preferably circumventing the need to apply test images to learn what compensation needs to be applied over time and condition.

The vignetting aspects of the camera lens aperture and assembly may also be captured and included in the result. The vignette aspect of the camera can be measured ahead of time using a flat white field image provided by a uniformly illuminated white flat field and stored away as a priori information. This information may also be stored in compressed form in the Reference Images and Data block 90.

The reference and measured imagery are compared in the Block Inverse Transform Calculator 100. The various test images, including spatial and color, are analyzed in this block. Salient and relevant features are extracted automatically preferably using variations of filter, threshold, linearity correction, and gamma correction methods. In order to obtain spatial compensation, the affine, perspective, bilinear, polynomial, piecewise polynomial, or global spline transformation, for examples, may be computed by comparing the measured spatial test pattern features with resident reference test image features. For color information, the gamma, gain and offsets of the camera, digitizer and projectors may be extracted. These and related features are categorized and solved to produce a set of spatial and color compensating transform coefficients.

The transformation coefficients, calculated typically in a non-real-time mode, are loaded into the Real-time Warper and Color Blender block 102. This block converts the coefficients into high-speed real-time compensation signals which are provided to the first projector 52. The Transformed Video Signal 72 is preferably a pre-warped version of the Input Video Stream 66. The pre-warping can be local or global with respect to the tile and its neighbors. The pre-warping may be applied in color and space or other artifact dimension, time separation for example, in a manner that, when the Transformed Video Signal 72 is passed through the projector-screen system, the output image emerges in spatial-temporal and color alignment, with little or no visible artifacts.

The Real-time Warper and Color Blender Block 102 can be implemented using a combination of standard processing components including high speed look-up tables, high speed digital signal processors, image memory, X, Y position counters, bilinear interpolation devices and/or forward differencing engines (made from coefficient registers, adders and latches, for example).

It is contemplated that the alignment may be implemented in relative or absolute terms. For example, if alignment is done with respect to a physical template, this may be considered to be an absolute alignment. If, on the other hand, no physical template is used, and the behavior of the tiles is characterized relative to attributes of neighbor tiles, then this may be considered a relative alignment.

The second sub-processor block 82 may be constructed in a similar manner. Because in some applications, the computation of a transformation function for one tile can depend on the information and transformation function of another tile, it is contemplated that an interface 106 may be provided between the first and second sub-processor blocks 80 and 82. This interface may allow the first sub-processing block 80 to communicate with the second sub-processing block. While the processor block 52 is shown having two separate sub-processing blocks 80 and 82, any number of other implementations are contemplated. For example, the processor block 52 may be implemented as an appropriately programmed general purpose microprocessor, an appropriately programmed digital signal processor, or any other implementation so long as the same or similar result is achieved.

Figure 5:
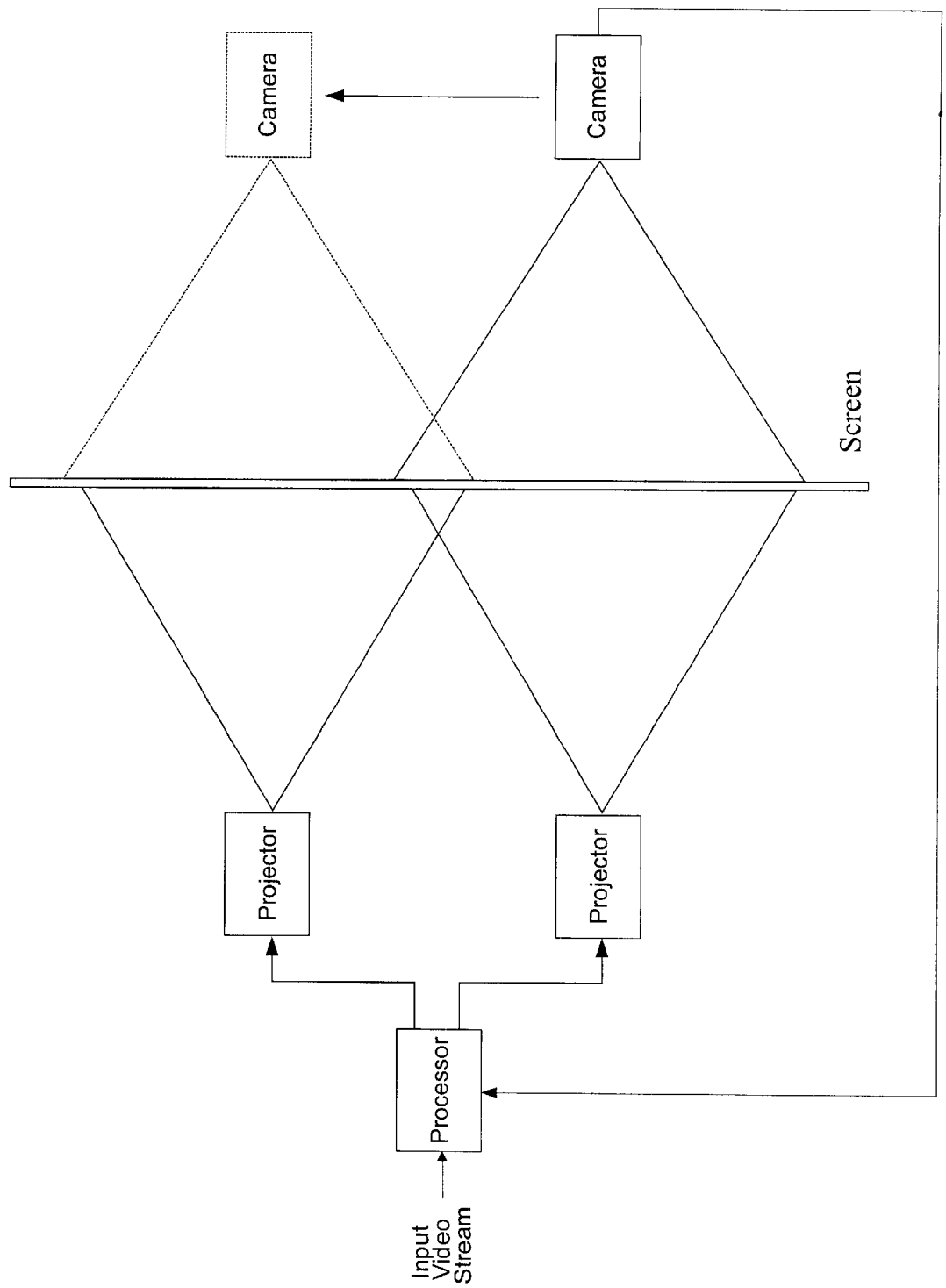
FIG. 5 is a schematic diagram of an embodiment similar to that shown in FIG. 3, but with the field-of-view of the camera encompassing only about one tile.

FIG. 5 is a schematic diagram of an embodiment similar to that shown in FIG. 3, but in this embodiment, the camera 120 has a field-of-view that encompasses only about one tile. In this configuration, the camera 120 may capture a series of images and its output used to determine a transformation function for the second projector 56, as described above. Subsequently, the camera 120 may be moved or its field of view moved using, for example, a deflecting mirror so that the field-of-view of the camera 120 encompasses the discrete image for the first projector 54, as shown at 122. Then, the camera 120 may capture a series of images, as described above, and its output used to determine a transformation function for the first projector 54. This may be repeated until a transformation function can be determined for each projector in the display.

Figure 6:
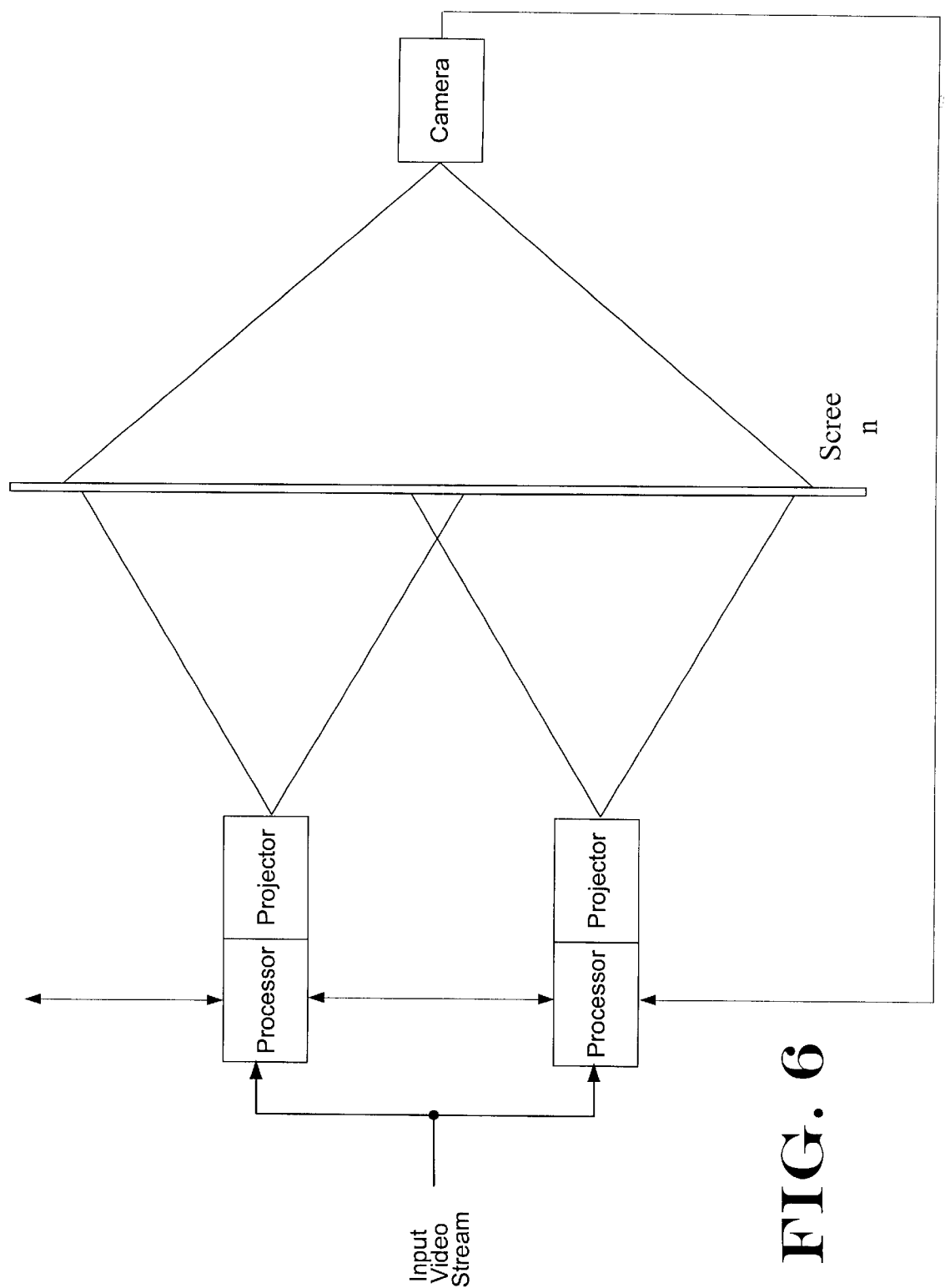
FIG. 6 is a schematic diagram of an embodiment similar to that shown in FIG. 3, but with the processing function of FIG. 3 distributed among the projectors.

FIG. 6 is a schematic diagram of an embodiment similar to that shown in FIG. 3, but with the processing function distributed among the projectors. As such, the first projector 54 and the second projector 56 each have a processor block 130 and 132, respectively, associated therewith.

An Inter-Processor I/O is also included. These I/O channels may be implemented as video channels, parallel and/or serial data bus transmission lines, or any other type of communication link, including array position encoders or other array signature means. With the I/O function provided, the processors 130 and 132 form a distributed array of processors, potentially eliminating the need for a central executive processor. In one embodiment, processor 130 may assume the function of a global executive, processor 132 may assume the function of a color blend calculator, while another (not shown) may assume the function of a spatial warp calculator, and yet another may assume the function of a built in test monitor, etc. Preferably, each processor applies the same type of appropriate transformation to the corresponding portion of the input video stream to achieve a real-time transformation process. While an executive processor is not precluded, the Inter-Processor I/O 134 permits each tile cluster of resources to engage in dialog with its neighbors. This may be implemented as a local and global arrangement of information including image measurement and system compensation. The function of the processor array may identify the location of each tile, identify the neighboring tiles, and analyze the results including selected neighboring results. Accordingly, an arbitrary number and configuration of tiles may be provided enabling the tiling modules to be added or subtracted transparently by the user.

Figure 7:
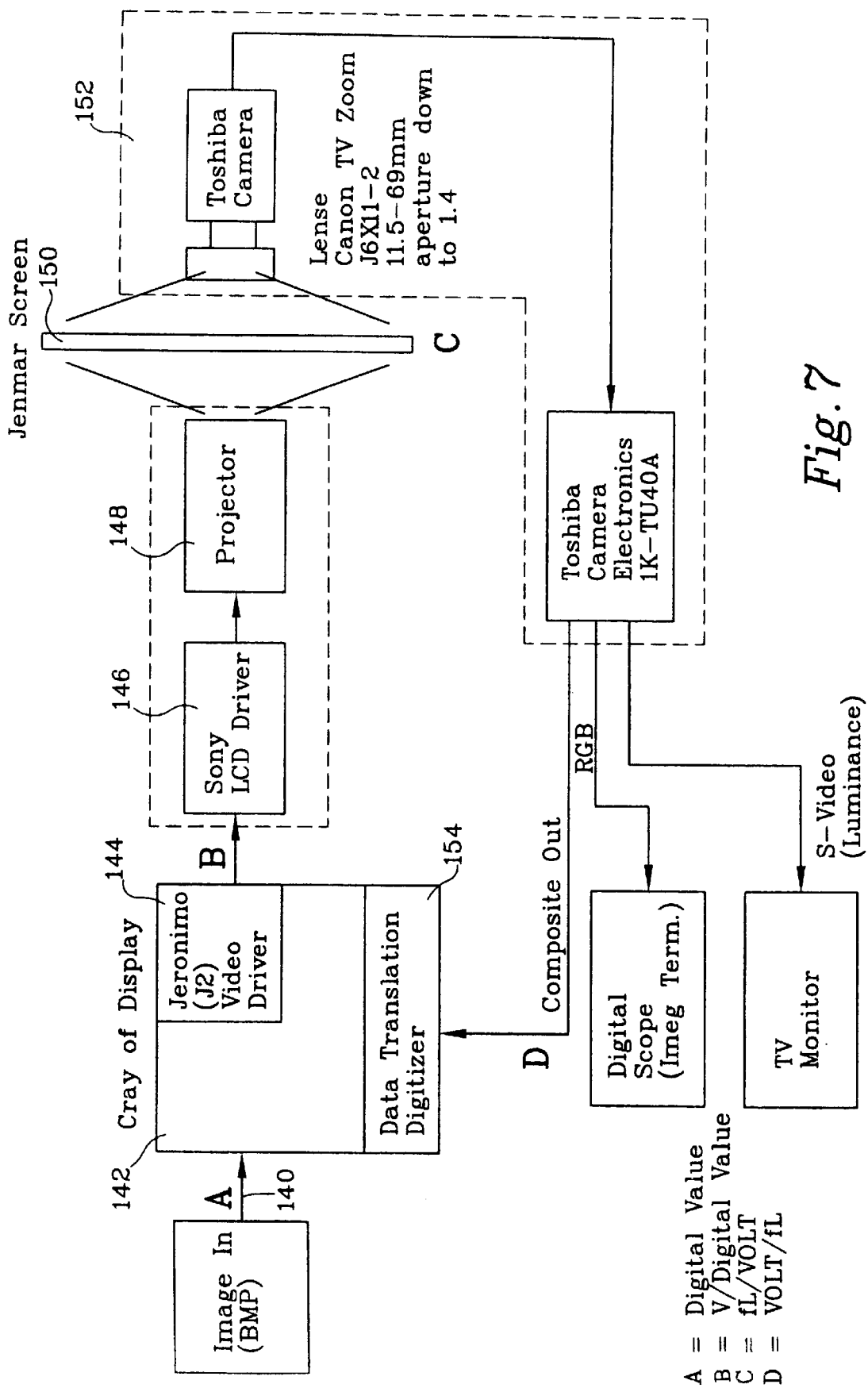
FIG. 7 is block diagram showing another embodiment of the present invention.

FIG. 7 is block diagram showing another embodiment of the present invention. An input image signal 140 is provided to a compensation device 142, where it is converted to or used as a reference signal image. Here, features may be extracted from the input image or, in the case of a calibration template, used as is. There the input signal is routed through to a video driver block 144. The signal is then provided to the Liquid Crystal Display (LCD) Driver 146. The LCD driver converts the input signal into special signals known in the art as required to drive the particular display device. The use of an LCD display is only illustrative. It is contemplated that the display device could be a DMD, ferroelectric, CRT or any type of electronic display.

In the example shown, the projector 148 outputs an image signal as modulated light that provides a viewable image on the screen 150. There, the image is seen by camera 152, which converts the image into an electronic signal. At each of these stages, distortion may be and typically is induced in the signal stream. The signal produced by the camera is then digitized by data translation digitizer block 154, converted into an image representation and compared to the reference signal image. The comparison is preferably done in terms of spatial and color image attributes.

Thereafter, a transformation that corresponds to the distortion of the system is generated. To characterize the spatial distortion an 81-point test pattern is provided (see, for example, FIGS. 11 and 12). The 81-point test pattern is used to generate a set of global transformation coefficients or different sets of local transform coefficients. The models for the spatial distortion of one tile include, for example, the affine, perspective, bilinear, polynomial, piecewise polynomial, and global spline transformations.

Figure 8:
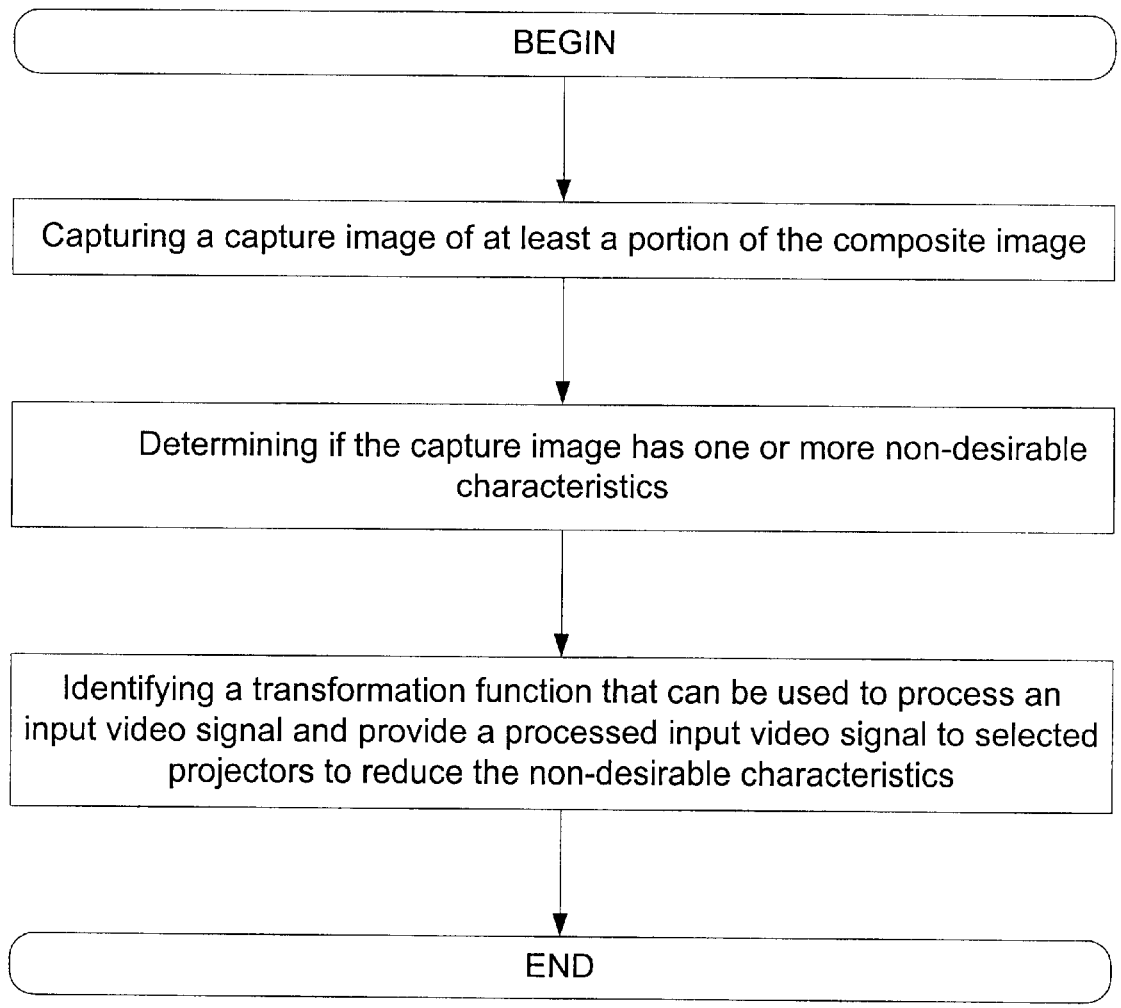
FIG. 8 is a flow diagram showing an illustrative method for calibrating a display.

In accordance with the above, FIG. 8 shows a flow diagram of an illustrative method for calibrating a display. The algorithm is entered at element 200, and control is passed to element 202. Element 202 captures a capture image of at least a portion of the composite image on a screen. Control is then passed to element 204. Element 204 determines if the capture image has one or more non-desirable characteristics. Control is then passed to element 206. Element 206 identifies a transformation function that can be used to process an input video signal and provide a processed input video signal to selected projectors to reduce the non-desirable characteristics. Control is then passed to element 208, wherein the algorithm is exited.

Figure 9:
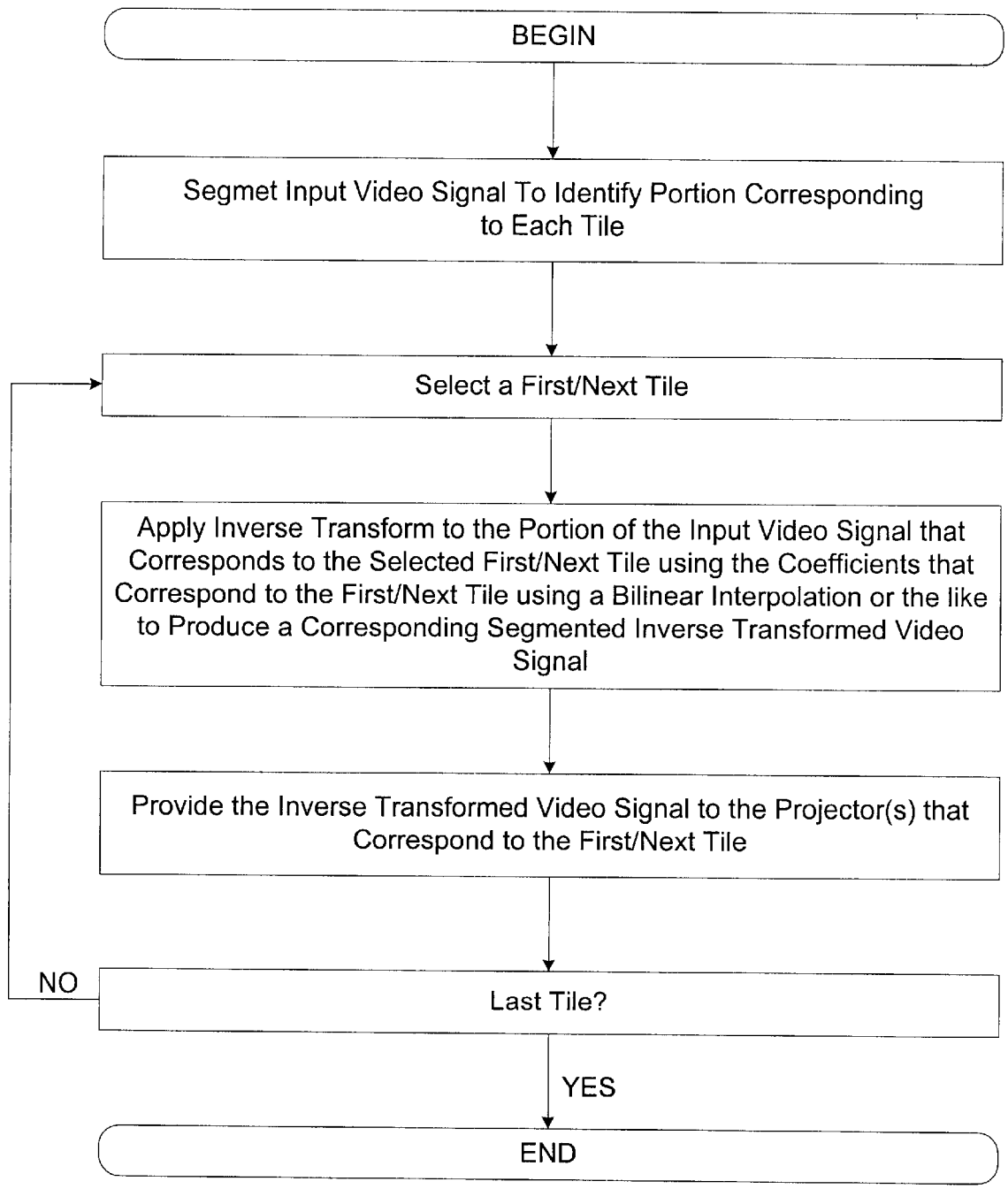
FIG. 9 is a flow diagram showing another illustrative method for calibrating a display, and in particular, a tiled display.

FIG. 9 is a flow diagram showing another illustrative method for calibrating a display, and in particular, a tiled display. The algorithm is entered at element 220, wherein control is passed to element 222. Element 222 segments the input video signal to identify a portion that corresponds to each tile of a tiled display. Control is then passed to element 224. Element 224 selects a first/next tile. Control is then passed to element 226. Element 226 applies a transformation to the portion of the input video signal that corresponds to the selected first/next tile by using the coefficients that correspond to the first/next tile and, through bi-linear interpolation or the like, producing a corresponding transformed input video signal. Control is then passed to element 228. Element 228 provides the transformed input video signal to the projector(s) that correspond to the first/next tile. Control is then passed to element 230. Element 230 determined if the selected first/next tile is the last tile in the display. If the selected first/next tile is not the last tile in the display, control is passed back to element 224. If, however, the selected first/next tile is the last tile in the display, control is passed to element 232, wherein the algorithm is existed. While the flow diagram shown in FIG. 9 shows processing each of the tiles sequentially, it is contemplated that the tiles may be processed in parallel.

Figure 10:
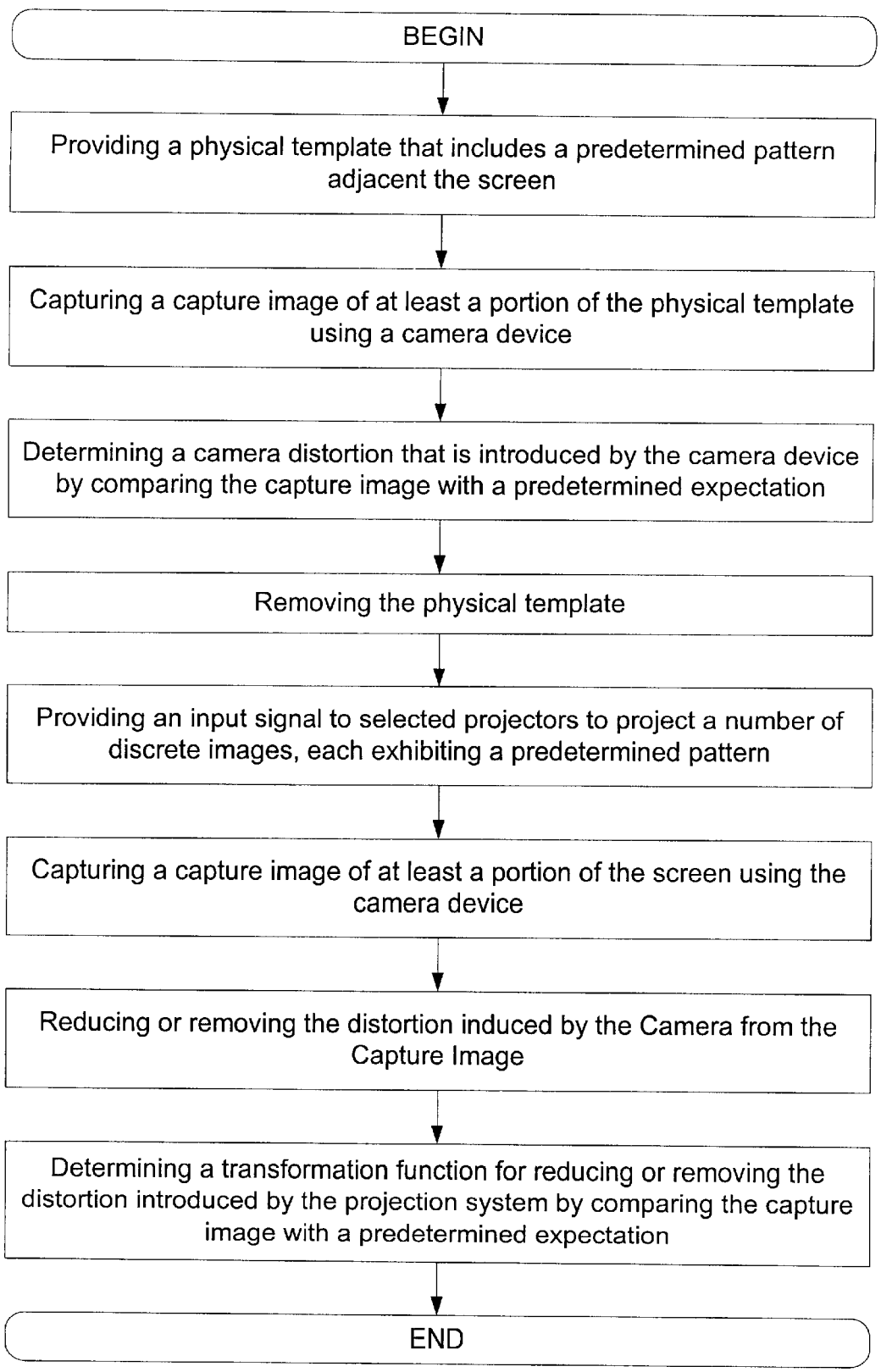
FIG. 10 is a flow diagram showing yet another illustrative method for calibrating a display, including distinguishing the distortion introduced by the camera from the distortion introduced by the rest of the display.

FIG. 10 is a flow diagram showing yet another illustrative method for calibrating a display, including distinguishing the distortion introduced by the camera from the distortion introduced by the rest of the display. The algorithm is entered at element 240, wherein control is passed to element 242. Element 242 provides a physical template adjacent to the screen. The physical template preferably includes a predetermined pattern. Control is then passed to element 244. Element 244 captures a capture image of at least a portion of the physical template using a camera device. Control is then passed to element 246. Element 246 determines a camera distortion that is introduced by the camera device by comparing the capture image with a predetermined expectation. Control is then passed to element 248. Element 248 removes the physical template. Control is then passed to element 250.

Element 250 provides an input signal to selected projectors to project a number of discrete images, each exhibiting a predetermined pattern. It is understood that only selected projectors may project a pattern, rather than all projectors. Control is then passed to element 252. Element 252 captures a capture image of at least a portion of the screen using the camera device. Control is then passed to element 254. Element 254 reduces or removes the distortion introduced by the camera from the capture image. Control is then passed to element 256. Element 256 determines a transformation function for reducing or removing the distortion introduced by the projection system by comparing the capture image with a predetermined expectation. Control is then passed to element 258, wherein the algorithm is exited.

Figure 11:
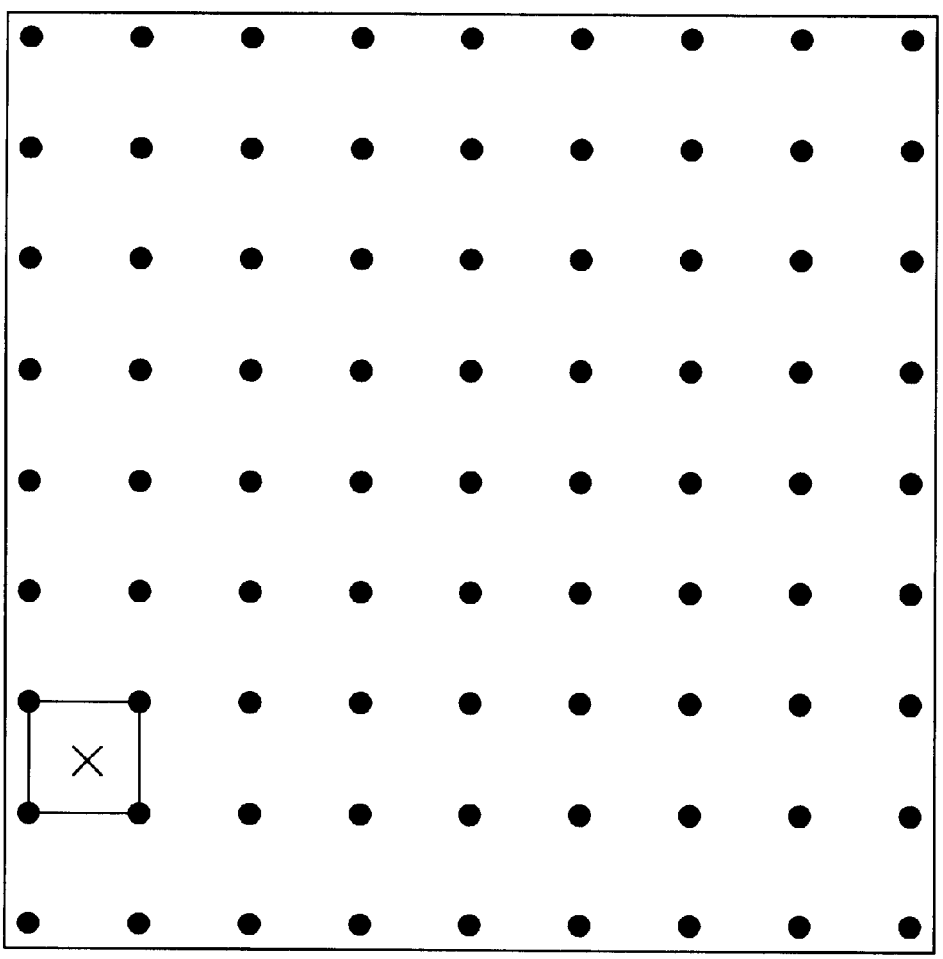
FIG. 11 is a diagram showing an illustrative pattern that is displayed and later captured for determining spatial distortions in the display.

FIG. 11 is a diagram showing an illustrative pattern with 9×9 dots that may be displayed and later captured for determining spatial distortions in a display. In the illustrative embodiment, each tile 268 is divided into eight segments across and eight segments down resulting in 64 quadrilateral regions. The vertices of each region are the corresponding tie points. Accordingly, the tie points in the array of regions are used to determine the local distortion in region 270 and others across the tile 268. Different sets of local transformation coefficients correspond to different quadrilateral regions. The geometric distortion within each region is modeled by a transformation function governed by a pair of bilinear equation with eight degrees of freedom. The eight transformation coefficients are determined by comparing the known locations of the four tie points in the capture image to the corresponding expected locations as determined, for example, using a capture image of the template overlay.

The appropriate correction factor for those locations that fall between the dots (for example, location 272) can be determined by using bilinear interpolation or the like. A further discussion of bilinear transformations can be found in *Digital Image Warping,* by George Wolberg, IEEE Computer Society Press Monograph, pages 50–51, which is incorporated herein by reference. A further discussion of spatial transforms can found in *Digital Image Processing,* 2nd edition, Refael C. Gonzalez and Paul Wintz, pages 246–251, which is also incorporated herein by reference.

It is contemplated that the dot pattern need not be a regular lattice of points but may be derived by extracting stochastically reliable anchor points from snapshots of the incoming video stream captured in frame or image memory. These may be further correlated using auto and cross correlation algorithms, Bissels algorithm for example, which assimilates common points from a cloud of points viewed from different locations.

Figure 12:
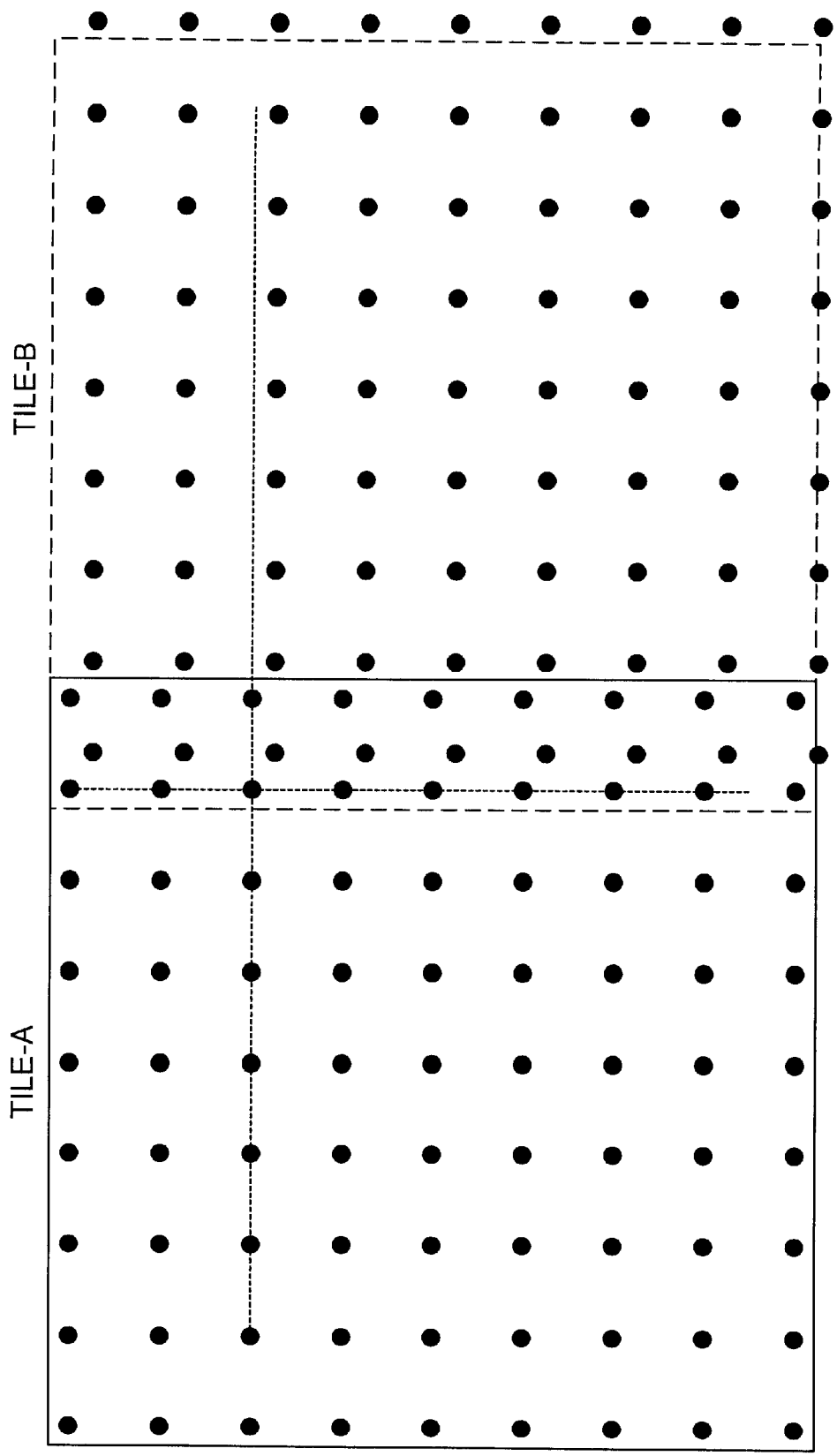
FIG. 12 is a diagram showing the illustrative pattern of FIG. 11 displayed on two adjacent and overlapping tiles, also for determining spatial distortions in the display.

FIG. 12 is a diagram showing the illustrative pattern of FIG. 11 displayed on two adjacent and overlapping tiles. A first tile is shown at 290 and a second tile is shown at 292. The first tile 290 and the second tile 292 are overlapping by a predetermined amount, as shown at 294. Each tile has a projector (not shown) for projecting a discrete image onto the corresponding tile. In the embodiment shown, each of the projectors is projecting a 9×9 array of dots. If the projectors were properly aligned, and there was no distortion in the system, each of the dots in the overlap region 294 would overlap one another. However, and as shown in FIG. 12, if the projectors are not aligned the dots do not overlap one another.

To correct for this misalignment/distortion as detected by the camera and feedback system described herein, the present invention contemplates pre-warping the input video signal so that the corresponding dots properly align with one another. For example, the first projector, which corresponds to the first tile 290, projects dot 296, and a second projector, which corresponds to the second tile 292, projects a corresponding dot 298. A first transformation function may be provided for effectively moving the location of the first dot 296 toward the second dot 298 when applied to the input signal of the first projector. Alternatively, or in addition to, a second transformation may be provided for effectively moving the location of the second dot 298 toward the first dot 296 when applied to the input signal of the second projector. If done properly, the first dot 296 and the second dot 298 overlap one another on the screen. Further, if done in accordance with the absolute or relative methods referred to above, then the compensated image is constrained globally and appropriately over the entire image.

Using a relative compensation method, it is contemplated that the first transformation function may move the location of the first dot 296 toward the second dot 298 by an amount substantially equal to one-half the distance between the first and second dots. Likewise, the second transformation function may move the location of the second dot 298 toward the first dot 296 by an amount substantially equal to one-half the distance between the first and second dots. This is a straight averaging approach, devoid of global fit constraints like having to ensure that the implied grid lines are straight through the first derivative and equally spaced and is shown explicitly in FIG. 13.

Alternatively, or in addition to, the first transformation function may move the location of the first dot 296 toward the second dot 298 by an amount that is weighted by a predetermined blending function or some other factor at the first dot 296 relative to the second dot 298, and the second transformation function may move the location of the second dot 298 toward the first dot 296 by an amount that is weighted by a predetermined blending function or some other factor at the second dot relative to the first dot 296. This is a weighted average approach, and is shown explicitly shown in FIG. 14. Preferably, the weighting function relates to the blending function used for blending the color information of the tiles. This may be a ramp or spline or some other suitable function known in the art.

When more than two corresponding dots must be considered, such as when three or more images overlap in a selected region, each of the corresponding dots may be moved toward a corrected location. This may be accomplished by using a similar averaging or weighted averaging approach, as discussed above.

Other approaches are also contemplated. For example, it is contemplated that the transformation functions may maintain a predetermined relationship between selected dots. For example, dots 300, 302, 304 and 306 are from a common row of dots, and thus should fall along a common line 308. The transformation functions may maintain a linear relationship between these dots while still compensating for the distortion in the system. Likewise, dots 310, 312 and 314 are from a common column of dots, and thus should fall along a common line 316. The transformation functions may maintain a linear relationship between these dots while still compensating for the distortion in the system. Preferably, the linear relationship will provide continuity through the first derivative of the line functions and will preserve relatively uniform spacing among the implied connecting lines.

Figure 15:
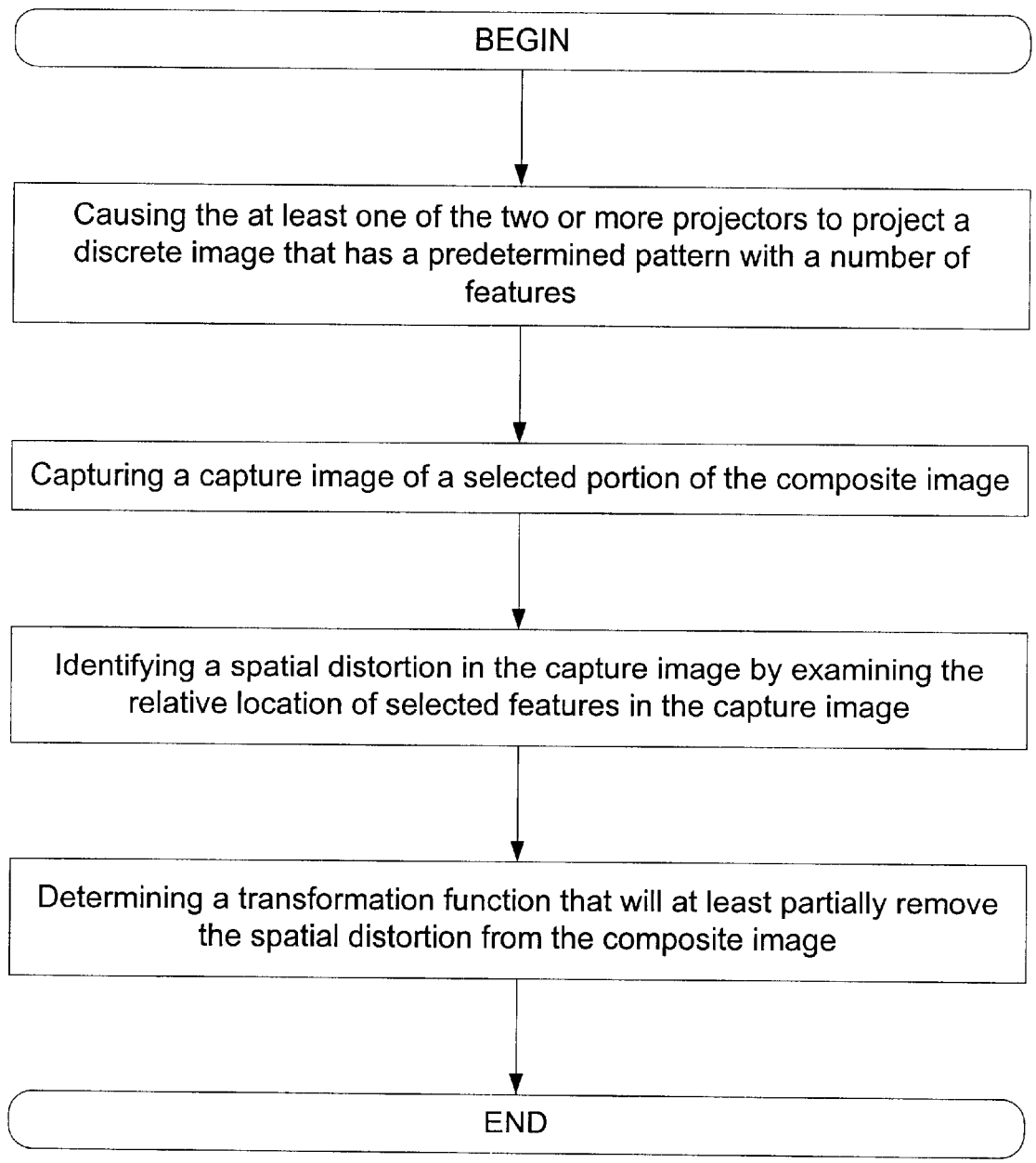
FIG. 15 is a flow diagram showing an illustrative method for at least partially removing a spatial distortion from the display.

In accordance with the above, FIG. 15 is a flow diagram showing an illustrative method for at least partially removing a spatial distortion from the display. The algorithm is entered at element 330, wherein control is passed to element 332. Element 332 causes at least one of the projectors to project a discrete image that has a predetermined pattern with a number of features. Control is then passed to element 334. Element 334 captures a capture image of a selected portion of the composite image. Control is then passed to element 336. Element 336 identifies a spatial distortion in the capture image by examining the relative location of selected features in the capture image. Control is then passed to element 338. Element 338 determines a transformation function that will at least partially remove the spatial distortion from the composite image. Control is then passed to element 340, wherein the algorithm is existed. Preferably, this method identifies the spatial distortion of the display by comparing projected image of a tile relative to the projected image of a neighbor tile, rather than or in addition to being relative to a physical template.

Figure 16:
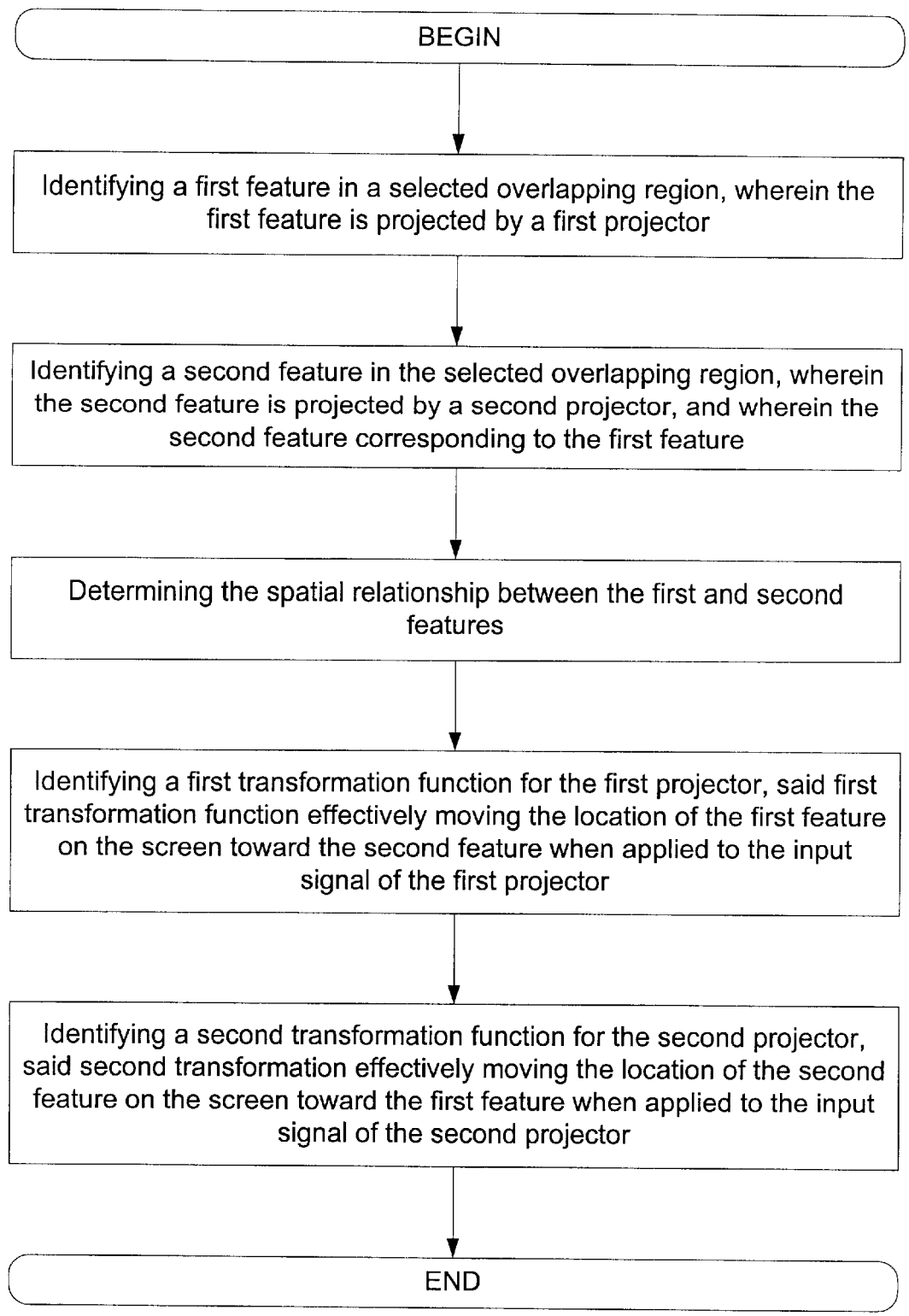
FIG. 16 is a flow diagram showing an illustrative method for identifying a transformation for a tiled display to at least partially removing a spatial distortion from the tiled display.

FIG. 16 is a flow diagram showing a method for identifying a transformation for a tiled display to at least partially removing a spatial distortion from the tiled display. The algorithm is entered at element 350, wherein control is passed to element 352. Element 352 identifies a first feature in a selected overlapping region, wherein the first feature is projected by a first projector. This first feature may be extracted from a snapshot of the incoming video image. Control is then passed to element 354. Element 354 identifies a second feature in the selected overlapping region, wherein the second feature is projected by a second projector, and wherein the second feature corresponds to the first feature. Again, the second feature may be extracted from the incoming standard video input. Control is then passed to element 356. Element 356 determines the spatial relationship between the first and second features, illustrative of establishing the relationship among an ensemble of features. Control is then passed to element 358. Element 358 identifies a first transformation function for the first projector. The first transformation function effectively moves the location of the first feature toward a corrective location when it is applied to the input signal of the first projector. Control is then passed to element 360. Element 360 identifies a second transformation function for the second projector. The second transformation function, applied simultaneously with the first described, effectively moves the location of the second feature toward the corrective location when it is applied to the input signal of the second projector. Control is then passed to element 362, wherein the algorithm is existed. The calculation of the correction function may be done periodically while the output is passed to the transformation function for real-time correction.

In accordance with the present invention, the location of the dots may be determined by: subtracting a black capture image from the capture image that includes the dots; examining the resulting image content above a noise threshold using spatial filters which have an all-pass kernel; measuring the center of gravity of the dots to find the corresponding dot locations; eliminating dots whose energy threshold is below the threshold; sorting the dot locations for correlation with known or expected dot patterns and deriving corrective transformation functions therefrom.

Figure 17:
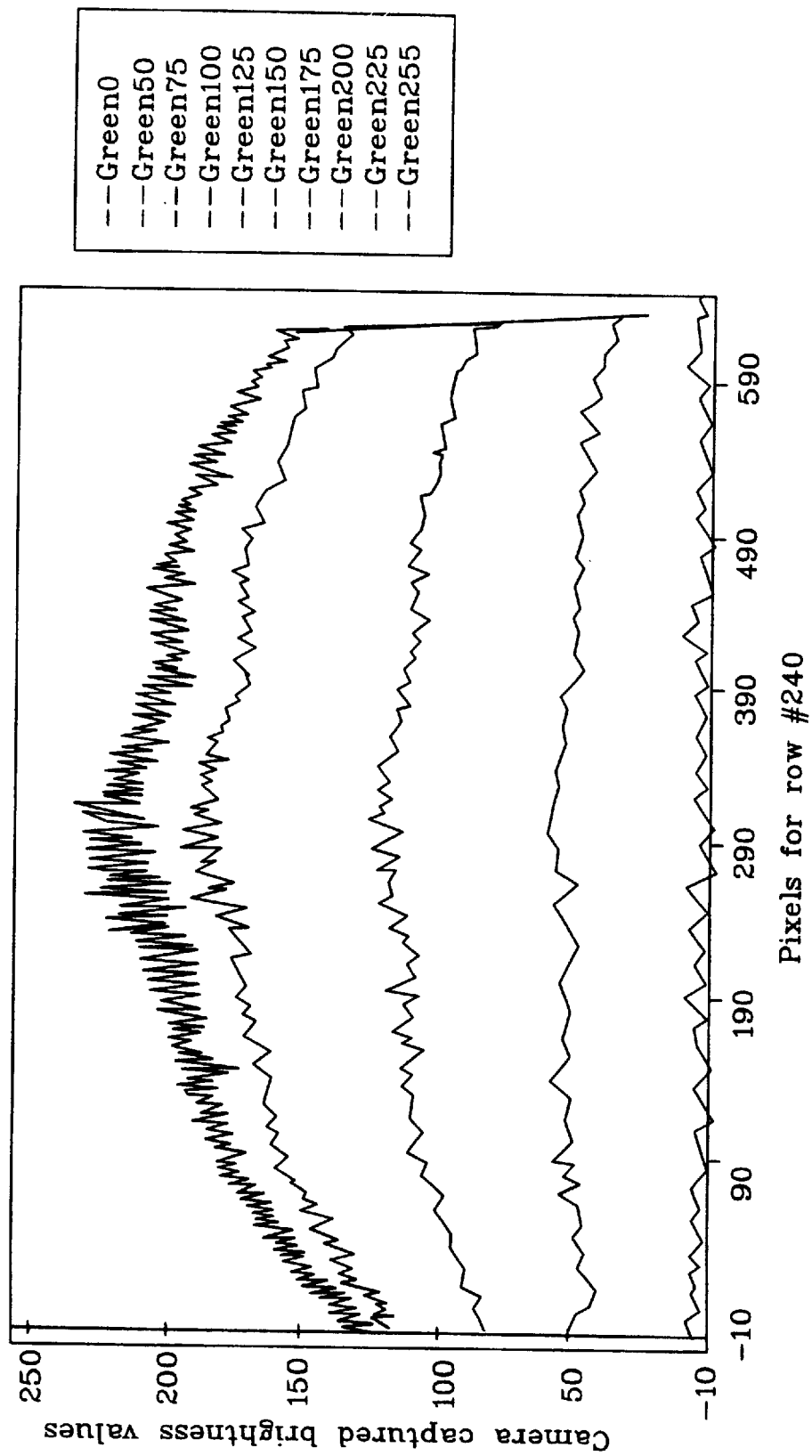
FIG. 17 is a graph showing the luminance domes for a LCD projector at various input intensities and showing how the dome shapes change depending on the input intensity level.

FIG. 17 is a graph showing the luminance domes for one LCD projector with various input intensities. As is evident, the magnitude of the luminance domes tends to increase as the input intensity increases. Also, the random brightness variation (e.g. noise) across the display tends to increases as the input intensity increases. This variation is attenuated and thus the signal to noise ratio augmented by filtering multiple time samples of dome capture images. This same general pattern is found for red, green and blue. In addition, each color typically has a different brightness value for the same input intensity. Further, in the case of polysilicon LCDs for example, the shape of the pattern changes as a function of the input intensity level, requiring the compensation function to attend to geometric and input intensity variables.

To determine the color and luminance distortion of a projection system, and in particular, a tiled display system, direct view or projection, a number of input signals of varying input intensity may be sequentially input to the projection display. This may be done at initial calibration or periodically. Each input signal may correspond to a flat field image of a selected color. For example, a first input signal may correspond to a red flat field image having an LCD intensity of "255". The next input signal may also correspond to a red flat field image, but may have a LCD intensity of "220". Input signals having progressively lower intensity may be provided until the input signal has a LCD intensity of "0". This process may be repeated for both blue and green or other color flat field images. A camera device may capture each of the flat field images, either as a single image if the field-of-view of the camera device corresponds to the entire display, or as multiple images if the camera device has a smaller field-of-view. The resolution of the camera device may be chosen to be appropriate with the selected field-of-view. For example, when the field-of-view of the camera device is relatively wide, capturing an image of the entire display, a higher resolution camera device may be used. Likewise, when the field-of-view of the camera device is relatively narrow, capturing an image of only a small portion of the display, a lower resolution camera device may be used. In any case, the resulting images are preferably stored as an array of capture images or reduced resolution capture images or as compression coefficient capture images. Once collected, the non-desirable characteristics of each capture image can be determined including the luminance or color domes for each projector.

Once the luminance or color domes are identified, a ceiling and floor function which may be a linear or a spline or other suitable function are preferably determined for both color (including hue) and intensity, across the entire display. For example, one projector may be brighter than another at maximum intensity (e.g. LCD "255"), and the brightness provided by each projector may decrease near the edges of the image. Accordingly, a ceiling may be selected to match the dimmest superposition area of the tiles when all projectors are operated at maximum intensity. Likewise, a floor may be selected to match the brightest super-position result of the tiles when all projectors are operated at minimum intensity (LCD "0").

Thereafter, a transformation function may be determined for compensating the luminance domes across selected tiles, and matching the brightness and color of each tile with adjacent tiles, thereby resulting in a linear display system. For example, the transformation function may be represented by a color look up table of captured or compressed color domes, a nearest neighbor detection and identification function and an interpolation function among the nearest neighbors to determine the input level needed at the display to output the desired linear output level. Preferably, the transformation function makes the luminance variation across the entire display less than about two percent for flat field test images, for example, which is less than one just-noticeable-difference (JND) according to Weber's Law. To help achieve this level of luminance uniformity, the transformation function is preferably a function of the X and Y location on the tile and of the input intensity level.

Figure 18:
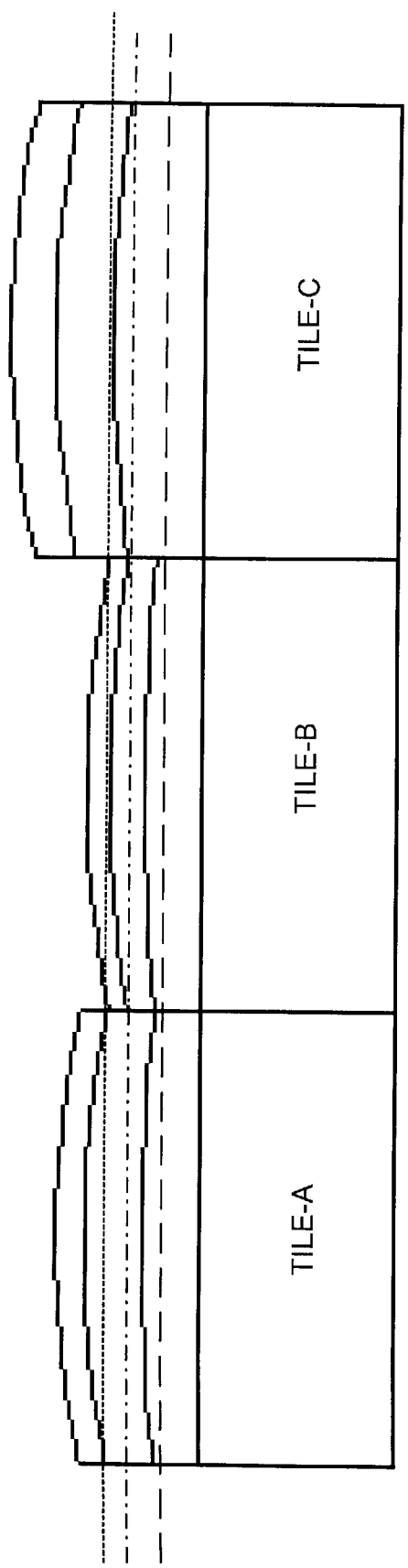
FIG. 18 is a schematic diagram showing the luminance domes for three tiled LCD projectors each at various input intensities.

FIG. 18 is a schematic diagram showing the luminance domes for three-tiled LCD projectors each at various input intensities. A first tile 370, second tile 372 and third tile 374 each have different maximum brightness values for a common LCD input intensity, such as an input intensity of "255" as shown at 376, 378 and 380, respectively. The transformation function for each of the tiles preferably compensates the luminance domes across selected tiles using the reduced luminance dome information to linearize the dome (x, y and input intensity dependent) behavior of each tile in the system and using the blending function to allow for display tile superposition. The transformation function also matches the hue of each tile with adjacent tiles, using the feedback image information in combination with known tri-stimulus color transformations or equivalent functions. For example, the transformation function for the first tile 370 may change the brightness in accordance with feedback behavior acquired at some time from the capture image of the first projector to lie along line 382 when the input intensity to the first projector has a value of "255" and when superposed over the output of tile 372. In the diagram shown, this may require that the center portion of the image be reduced more than the edge portions of the image because of the dome shape of the luminance profile. Likewise, the transformation function for the second tile 372 may change the brightness in accordance with feedback behavior acquired at some time from the capture image of the second projector to also lie along line 382 when the input intensity to the second projector has a value of "255" and when superposed with neighbor tile outputs. Finally, the transformation function for the third tile 374 may change the brightness of the third projector to lie along line 382 when the input intensity to the third projector has a value of "255" and in accordance with superposition with neighbor tile 372.

As alluded to above, the transformation functions are also preferably dependent on the input intensity that is provided to the projectors. This is the result of the dependence of the capture image domes on the input intensity to image sources like the polysilicon LCD.

For lower input intensities, the transformation functions may change the brightness of the first, second and third projectors to lie along, for example, lines 386 or 388 as a function of the blending functions, the luminance dome dependence on the X, Y location on the screen and input intensity to the tiled display system. In this way, the transformation functions may make the luminance, hue, and saturation variation across the entire display relatively small regardless of the input intensity provided. That accomplished or enabled, the image content may be arbitrary making the tiled display with camera feedback suitable for displaying general imagery.

Figure 19:
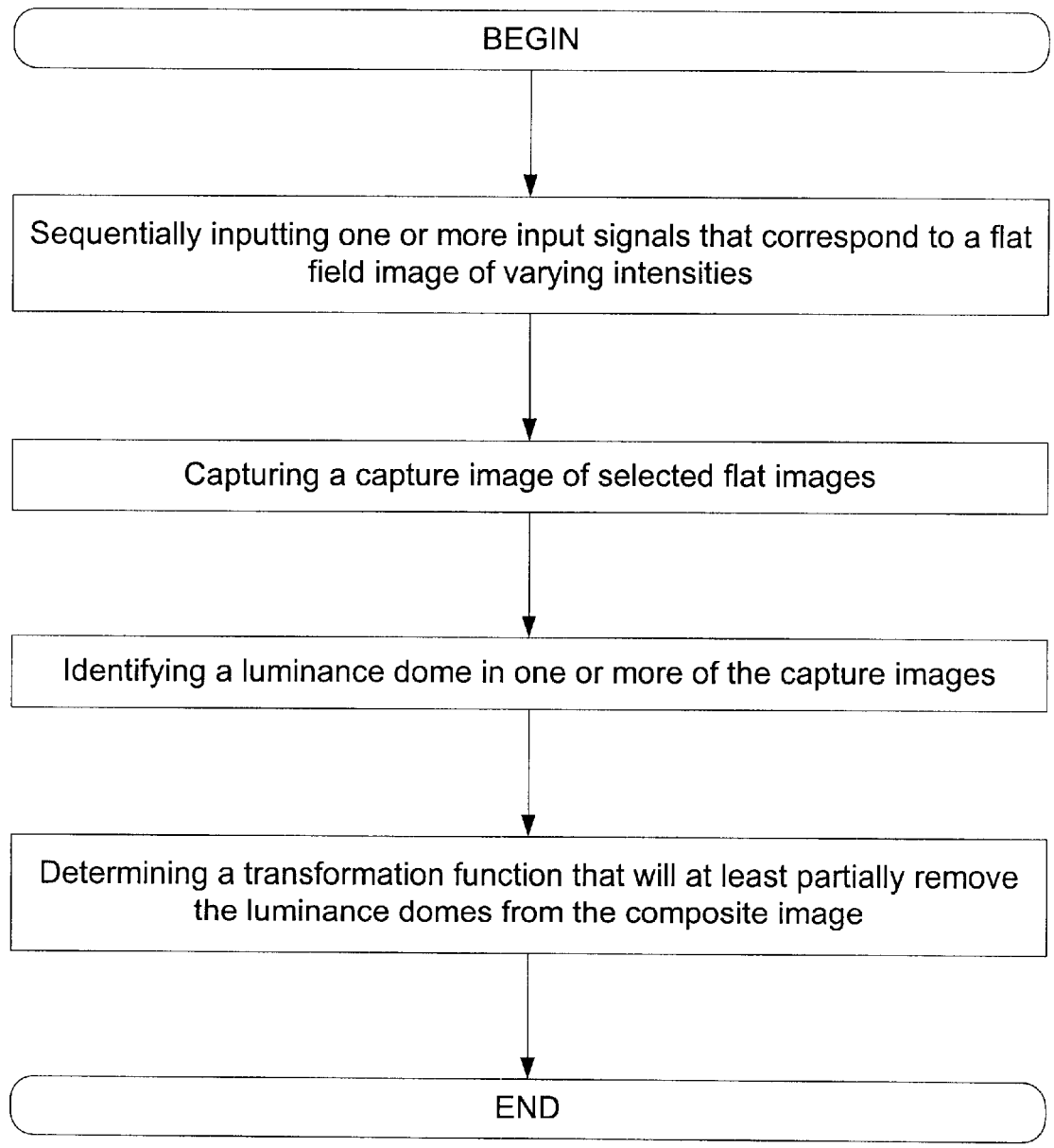
FIG. 19 is a flow diagram showing an illustrative method for at least partially removing a luminance distortion from the display.

In accordance with the above, FIG. 19 is a flow diagram showing a method for at least partially removing a luminance distortion from the display. The algorithm is entered at element 400, wherein control is passed to element 402. Element 402 sequentially inputs one or more input signals that correspond to a flat field image of varying intensity to each projector. Control is then passed to element 404. Element 404 captures a capture image of selected flat field images. Control is then passed to element 406. Element 406 identifies a luminance dome on one or more of the capture images. Control is then passed to element 408. Element 408 determines a feedback transformation function (dependent on X, Y and/or input intensity) that will at least partially remove the luminance domes from the composite image. Control is then passed to element 410, wherein the algorithm is existed.

Finally, a method for determining the boundaries of each tile of a tiled display when using a camera that has a field-of-view that encompasses more than one tile is contemplated. This method includes displaying a white field image, for example, on all but a selected tile. The camera may then capture an image of display including the selected tile. Then it is a relatively simple matter to determine the boundaries of the selected tile by identifying the location where the white field image begins/stops. Another method is to display a checkerboard pattern wherein each of the tiles assumes one of two flat field images. In this embodiment, the boundaries for each tile may be determined by identifying the location where each of the flat field images begins/stops. Another method is to display a pattern of dots whose outer boundaries when detected by the camera in combination with a detection function define the boundaries of each tile as well. These may be used by the feedback processor-camera system to identify, among other things, the alignment of the projectors relative to one another. Further, and when the discrete images overlap one another, these methods further identify the extent of the overlap.

Having thus described the preferred embodiments of the present invention, those of skill in the art will readily appreciate that the teachings found herein may be applied to yet other embodiments within the scope of the claims hereto attached.

What is claimed is:

1. A method for controlling a tiled display system that has two or more projectors, each projector manifesting one of a number of discrete images separately onto a viewing surface or screen in a tiled manner to form a tiled composite image, at least one of the discrete images overlapping an adjacent discrete image to form at least one overlapping region, the method comprising the steps of:

providing an input video stream to cause selected projectors to display a first test pattern;

capturing a capture image of at least a portion of the composite image, including at least a portion of at least one overlapping region;

examining the capture image to identify any undesirable artifacts in the capture image; and determining a transformation function that can be applied to the input video stream to at least partially remove the undesirable artifacts found in the composite image including in the at least one overlapping region.

2. A method for controlling a display system that has two or more displays, each display manifesting one of a number of discrete images separately onto a viewing surface or screen to form a composite image related to an input video stream, the method comprising the steps of:

identifying a number of anchor points or regions in the input video stream;

capturing a capture image of at least a portion of the composite image;

identifying a spatial distortion in the capture image by comparing the location of selected anchor points or regions of the capture image with the location of the corresponding anchor points or regions in the input video stream; and determining a transformation function that will at least partially remove the spatial distortion from the composite image.

3. The method of claim 2 wherein the step of identifying anchor points or regions includes the steps of:

saving a snapshot of the incoming video stream; and extracting stochastically reliable anchor points from the saved snapshot of the incoming video stream.

4. A method for calibrating a tiled projection display, the tiled projection display having two or more projectors, each receiving an input signal and each projecting one of a number of discrete images separately onto a screen to form a composite image, at least one of the discrete images overlapping an adjacent discrete image to form at least one overlapping region, the method comprising the steps of:

sequentially inputting to selected projectors an input signal that corresponds to a flat field image of a first color for each of a number of luminance intensities;

capturing a capture image of selected flat field images, including at least a portion of at least one overlapping region;

saving the capture images to a memory;

determining a distortion in the composite image by examining the captured flat field images; and identifying a transformation function that can be applied to the input signals to at least partially remove the distortion from the composite image including in the at least one overlapping region.

5. The method of claim 4 wherein the transformation function is dependent on luminance intensity.

6. The method of claim 5 wherein the transformation function is dependent on an X-Y location of the composite image.

7. The method of claim 4 wherein the capture images are saved into the memory as reduced resolution images.

8. The method of claim 4 wherein the capture image is captured from a side of the screen that is opposite to a viewing side.

9. The method of claim 4 wherein the capture image is captured from a viewing side of the screen.

10. A method for calibrating a tiled projection display, the tiled projection display having two or more projectors, each receiving an input signal and each projecting one of a number of discrete images separately onto a screen to form a composite image, the method comprising the steps of:

providing an input signal to selected projectors to project a number of discrete images for a predetermined period of time, each discrete image having a predetermined pattern with a number of features;

selecting a first image area that is part of the composite image;

aligning the camera to the first image area;

capturing the first capture image;

saving the first capture image;

selecting a second image area that is part of the composite image;

aligning the camera to the second image area;

capturing the second capture image;

saving the second capture image;

determining a distortion in the composite image by comparing the first and second capture images; and identifying a transformation function that can be applied to the input signal of selected displays to at least partially remove the distortion from the composite image.

11. A method for calibrating a tiled projection display, the tiled projection display having two or more projectors, each receiving an input signal and each projecting one of a number of discrete images separately onto a screen to form a composite image, the method comprising the steps of:

selecting in sequence each of the projectors and, for each projector:
preventing all non-selected projectors from generating an image;
providing an input signal to the selected projector causing the selected projector to project a discrete image that has a predetermined pattern;
capturing the composite image;
determining a distortion in the composite image by examining the relative location of selected features of the predetermined pattern in the capture image;
identifying a transformation function that can be applied to the input signal of the selected projector to at least partially remove the distortion from the composite image; and
saving the identified transformation function.

12. The method of claim 11 further comprising the steps of:

inputting an input signal to each projector, the input signals collectively producing a discrete image that has a predetermined pattern;

applying the saved transformation functions to the corresponding input signals;

capturing a composite image;

determining a distortion in the composite image by examining the relative location of selected features in the capture image; and identifying a transformation function that can be applied to the input signals to at least partially remove the distortion from the composite image.

13. A method for controlling a display system that has two or more displays, each display manifesting one of a number of discrete images separately onto a viewing surface or screen to form a composite image related to an input video stream, at least one of the discrete images overlapping an adjacent discrete image to form at least one overlapping region, the method comprising repeating the steps of:

- capturing a first capture image of a first portion of the composite images, including at least a portion of at least one overlapping region;
- determining if the first capture image has one or more non-desirable characteristics;
- identifying a first transformation function that can be used to process the input video stream and provide a processed input video signal to selected displays to reduce the non-desirable characteristics in the first portion of the composite image, including at least a portion of at least one overlapping region;
- capturing a second capture image of a second portion of the composite images; and
- identifying a second transformation function that can be used to process the input video stream and provide a processed input video signal to selected displays to reduce the non-desirable characteristics in the second portion of the composite image.

14. The method according to claim 13 wherein at least one of the discrete images overlaps an adjacent discrete image to form at least one overlapping region.

15. The method according to claim 13 wherein the capture image is captured from a side of the viewing surface or screen that is opposite to a viewing side.

16. The method according to claim 13 wherein the capture image is captured from a viewing side of the viewing surface or screen.

17. A method for calibrating a tiled projection display, the tiled projection display having two or more projectors, each receiving an input signal and each projecting one of a number of discrete images separately onto a screen to form a composite image, the method comprising the steps of:

- sequentially inputting to selected projectors an input signal that corresponds to a flat field image of a first color for each of a number of luminance intensities;
- capturing a capture image of selected flat field images from a viewing side of the screen;
- saving the capture images to a memory;
- determining a distortion in the composite image by examining the captured flat field images; and
- identifying a transformation function that can be applied to the input signals to at least partially remove the distortion from the composite image.

* * * * *

UNITED STATES PATENT AND TRADEMARK OFFICE
CERTIFICATE OF CORRECTION

| | | |
|---|---|---|
| PATENT NO. | : 6,525,772 B2 | Page 1 of 1 |
| APPLICATION NO. | : 09/877603 | |
| DATED | : February 25, 2003 | |
| INVENTOR(S) | : Michael J. Johnson, Chung-Jen Chen, Rajesh Chandrasekhar | |

It is certified that error appears in the above-identified patent and that said Letters Patent is hereby corrected as shown below:

In column 1, line 4, please insert the following as the first paragraph of the specification:

--This invention was made with Government support under Contract NAS1-20219 awarded by NASA. The Government has certain rights in this invention.--.

Signed and Sealed this

Eighteenth Day of July, 2006

JON W. DUDAS
*Director of the United States Patent and Trademark Office*